(12) United States Patent
Jia

(10) Patent No.: US 11,199,699 B2
(45) Date of Patent: Dec. 14, 2021

(54) CAMERA LENS ASSEMBLY

(71) Applicant: ZHEJIANG SUNNY OPTICAL CO., LTD., Ningbo (CN)

(72) Inventor: Yuanlin Jia, Ningbo (CN)

(73) Assignee: ZHEJIANG SUNNY OPTICAL CO., LTD., Ningbo (CN)

( * ) Notice: Subject to any disclaimer, the term of this patent is extended or adjusted under 35 U.S.C. 154(b) by 193 days.

(21) Appl. No.: 16/231,127

(22) Filed: Dec. 21, 2018

(65) Prior Publication Data
US 2019/0121127 A1   Apr. 25, 2019

Related U.S. Application Data

(63) Continuation of application No. PCT/CN2018/077204, filed on Feb. 26, 2018.

(30) Foreign Application Priority Data

Jul. 25, 2017 (CN) .......................... 201710609936.8
Jul. 25, 2017 (CN) .......................... 201720904063.9

(51) Int. Cl.
*G02B 27/00* (2006.01)
*G02B 9/34* (2006.01)
(Continued)

(52) U.S. Cl.
CPC ......... *G02B 27/0081* (2013.01); *G02B 5/208* (2013.01); *G02B 9/34* (2013.01);
(Continued)

(58) Field of Classification Search
CPC .. G02B 27/0081; G02B 13/004; G02B 13/04; G02B 9/34; G02B 13/18; G02B 9/58; G02B 5/208
(Continued)

(56) References Cited

U.S. PATENT DOCUMENTS

2014/0153116 A1* 6/2014 Kubota ................ G02B 13/004
                                                              359/715
2017/0017060 A1* 1/2017 Liu .......................... G02B 9/34
(Continued)

FOREIGN PATENT DOCUMENTS

CN    103777315 A    5/2014
CN    104142565 A   11/2014
(Continued)

*Primary Examiner* — Thomas K Pham
*Assistant Examiner* — Alberto J Betancourt
(74) *Attorney, Agent, or Firm* — Hauptman Ham, LLP

(57) ABSTRACT

The present disclosure discloses a camera lens assembly. The camera lens assembly has an effective focal length f and an entrance pupil diameter EPD, and includes a first lens, a second lens, a third lens, and a fourth lens in sequence from an object side to an image side along an optical axis. The first lens has a negative refractive power, and an image-side surface thereof is a concave surface. The second lens has a positive refractive power or a negative refractive power. The third lens has a positive refractive power. The fourth lens has a positive refractive power or a negative refractive power, and an image-side surface thereof is a convex surface. An effective radius DT11 of an object-side surface of the first lens and half of a diagonal length ImgH of an effective pixel area on an electronic photosensitive element of the camera lens assembly satisfy: $1.2 < DT11/ImgH < 2.6$.

13 Claims, 11 Drawing Sheets

(51) Int. Cl.
  *G02B 13/18* (2006.01)
  *G02B 9/58* (2006.01)
  *G02B 5/20* (2006.01)
  *G02B 13/00* (2006.01)
  *G02B 13/04* (2006.01)

(52) U.S. Cl.
  CPC ............ *G02B 9/58* (2013.01); *G02B 13/004* (2013.01); *G02B 13/04* (2013.01); *G02B 13/18* (2013.01)

(58) Field of Classification Search
  USPC .................. 359/642, 715, 754, 771, 781
  See application file for complete search history.

(56) References Cited

U.S. PATENT DOCUMENTS

2017/0315326 A1* 11/2017 Lai .................... G02B 9/34
2018/0059375 A1* 3/2018 Hsueh ................ G02B 13/0045

FOREIGN PATENT DOCUMENTS

| CN | 106842549 A | 6/2017 |
| CN | 107167901 A | 9/2017 |
| JP | 2003029142 A | 1/2003 |

\* cited by examiner

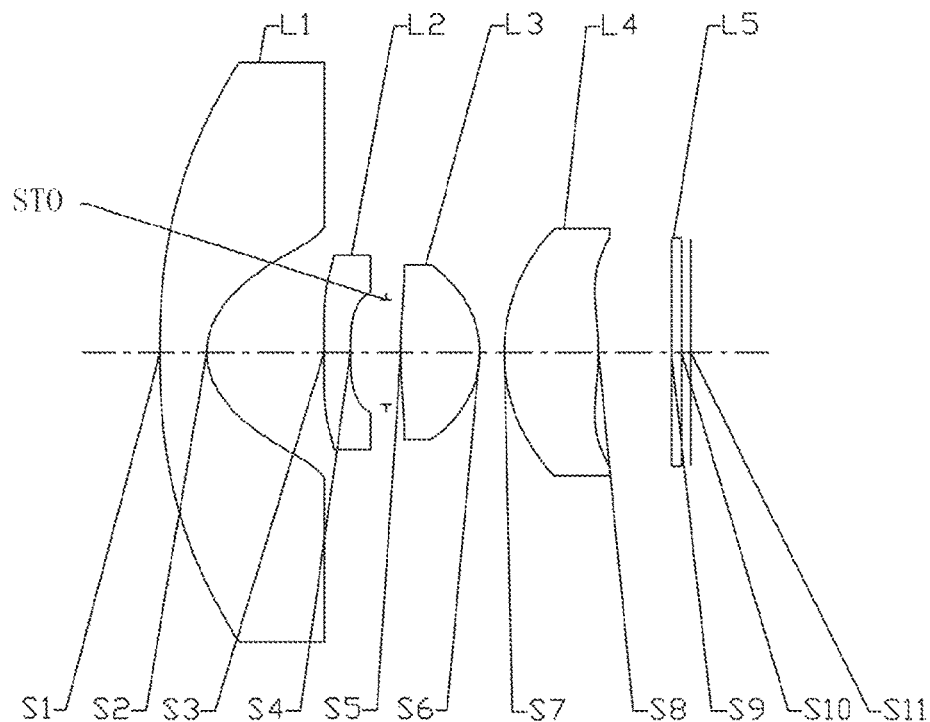
Fig. 9
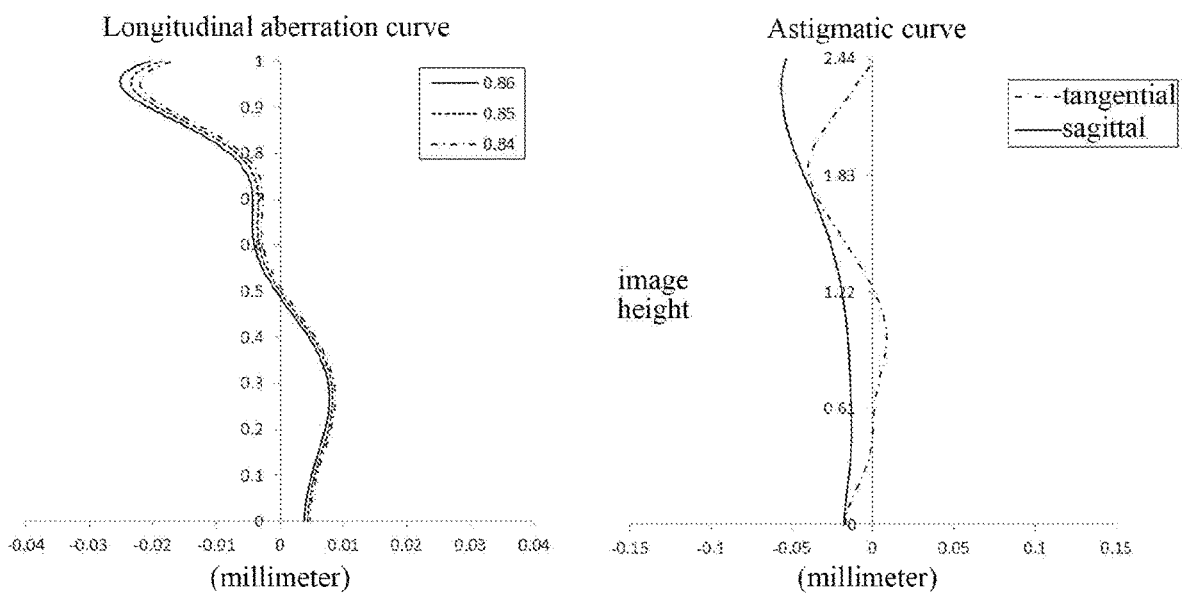
Fig. 10A
Fig. 10B

CAMERA LENS ASSEMBLY

CROSS-REFERENCE TO RELATED APPLICATIONS

This is a continuation of International Application PCT/CN2018/077204, with an international filing date of Feb. 26, 2018, which claims the priorities and rights to Chinese Patent Application No. 201710609936.8 and Chinese Patent Application No. 201720904063.9 filed with the China National Intellectual Property Administration (CNIPA) on Jul. 25, 2017, the disclosures of which are hereby incorporated by reference in their entireties.

TECHNICAL FIELD

The present disclosure relates to a camera lens assembly, and more specifically to a camera lens assembly including four lenses.

BACKGROUND

Recently, in frontier areas such as VR/AR (virtual reality/augmented reality), robot, security, and autonomous driving, three-dimensional depth cameras are highly relied on. Comparing with normal cameras, the three-dimensional depth cameras may acquire depth information of captured objects in addition to being able to acquire planar images, the depth information including the three-dimensional position and the size. Therefore, the entire computing system acquires three-dimensional data of the environment and the objects, which may be applied to technical fields such as human body tracking, three-dimensional reconstruction, human-computer interaction, and SLAM (Simultaneous Localization and Mapping).

At present, there are generally three technical solutions for the three-dimensional depth measurement, which are dual-camera, structured light, and TOF respectively. TOF is an abbreviation for the time of flight technology, which is to calculate the flight time of light. The TOF technology is widely used because of its advantages such as fast responding speed, high accuracy of depth information, small structural size and unsusceptible to environment lights.

Therefore, the present disclosure is intended to provide a camera lens assembly having a large aperture, a large field-of-view, a high resolution and a high imaging quality and may be applicable to various fields, particularly in the field of three-dimensional depth measurement.

SUMMARY

The technical solution provided by the present disclosure at least partially solves the technical problem described above.

According to an aspect, the present disclosure provides a camera lens assembly. The camera lens assembly has an effective focal length f and an entrance pupil diameter EPD. The camera lens assembly includes a first lens, a second lens, a third lens, and a fourth lens in sequence from an object side to an image side along an optical axis. The first lens may have a negative refractive power, and an image-side surface of the first lens is a concave surface. The second lens may have a positive refractive power or a negative refractive power. The third lens may have a positive refractive power. The fourth lens may have a positive refractive power or a negative refractive power, and an image-side surface of the fourth lens is a convex surface. An effective radius DT11 of an object-side surface of the first lens and half of a diagonal length ImgH of an effective pixel area on an electronic photosensitive element of the camera lens assembly satisfy: $1.2<DT11/ImgH<2.6$.

According to another aspect, the present disclosure further provides a camera lens assembly. The camera lens assembly has an effective focal length f and an entrance pupil diameter EPD. The camera lens assembly includes a first lens, a second lens, a third lens, and a fourth lens in sequence from an object side to an image side along an optical axis. The first lens has a negative refractive power, and an image-side surface of the first lens is a concave surface. The third lens has a positive refractive power. An image-side surface of the fourth lens is a convex surface. A combined refractive power of the first lens and the second lens is negative. A combined refractive power of the third lens and the fourth lens is positive. An effective radius DT32 of an image-side surface of the third lens and an effective focal length f3 of the third lens satisfy: $0.1<DT32/f3<0.6$.

According to another aspect, the present disclosure further provides a camera lens assembly. The camera lens assembly has an effective focal length f and an entrance pupil diameter EPD. The camera lens assembly includes a first lens, a second lens, a third lens, and a fourth lens in sequence from an object side to an image side along an optical axis. The first lens has a negative refractive power, and an image-side surface of the first lens is a concave surface. The third lens has a positive refractive power. An image-side surface of the fourth lens is a convex surface. A combined refractive power of the first lens and the second lens is negative. A combined refractive power of the third lens and the fourth lens is positive. $0.9<SAG11/CT1<1.75$, for example, $0.93 \leq SAG11/CT1 \leq 1.71$ may be satisfied, SAG11 is a distance from an intersection point of the object-side surface of the first lens and the optical axis to an effective radius vertex of the object-side surface of the first lens on the optical axis, and CT1 is a center thickness of the first lens on the optical axis.

In an embodiment, an effective focal length f1 of the first lens and the effective focal length f of the camera lens assembly may satisfy: $-4<f1/f<-2$, for example, $-2.84 \leq f1/f \leq -2.32$.

In an embodiment, the effective focal length f of the camera lens assembly and the entrance pupil diameter EPD of the camera lens assembly may satisfy: $f/EPD \leq 1.8$, for example, $f/EPD \leq 1.19$.

In an embodiment, the half of the diagonal length ImgH of the effective pixel area on the electronic photosensitive element of the camera lens assembly and the effective focal length f of the camera lens assembly may satisfy: $Imgh/f>1$, for example, $Imgh/f \geq 1.19$.

In an embodiment, a radius of curvature R2 of the image-side surface of the first lens and the effective focal length f of the camera lens assembly may satisfy: $1<R2/f<1.5$, for example, $1.06 \leq R2/f \leq 1.38$.

In an embodiment, $0.2<CT1/(CT2+CT3+CT4)<0.5$, for example, $0.23 \leq CT1/(CT2+CT3+CT4) \leq 0.37$ may be satisfied. CT1 is the center thickness of the first lens on the optical axis. CT2 is a center thickness of the second lens on the optical axis. CT3 is a center thickness of the third lens on the optical axis. CT4 is a center thickness of the fourth lens on the optical axis.

In an embodiment, $2<T12/T23<4$, for example, $2.06 \leq T12/T23 \leq 3.75$ may be satisfied. T12 is an air spacing distance between the first lens and the second lens on the optical axis. T23 is an air spacing distance between the second lens and the third lens on the optical axis.

In an embodiment, the effective radius DT11 of the object-side surface of the first lens and the half of the diagonal length ImgH of the effective pixel area on the electronic photosensitive element of the camera lens assembly may satisfy: $1.2<DT11/ImgH<2.6$, for example, $1.24 \leq DT11/ImgH \leq 2.56$.

In an embodiment, the effective radius DT32 of the image-side surface of the third lens and the effective focal length f3 of the third lens may satisfy: $0.1<DT32/f3<0.6$, for example, $0.18 \leq DT32/f3 \leq 0.55$.

In an embodiment, $0.3<\Sigma CT/TTL<0.6$, for example, $0.35 \leq \Sigma CT/TTL \leq 0.46$ may be satisfied. $\Sigma CT$ is a sum of center thicknesses of the first lens to the fourth lens on the optical axis. TTL is a distance from the object-side surface of the first lens to an image plane on the optical axis.

In an embodiment, $0.9<SAG11/CT1<1.75$, for example, $0.93 \leq SAG11/CT1 \leq 1.71$ may be satisfied. SAG11 is the distance from the intersection point of the object-side surface of the first lens and the optical axis to the effective radius vertex of the object-side surface of the first lens on the optical axis. CT1 is the center thickness of the first lens on the optical axis.

In an embodiment, an infrared bandpass filter is disposed between the fourth lens and an image plane of the camera lens assembly.

In an embodiment, a combined refractive power of the first lens and the second lens may be negative, and a combined refractive power of the third lens and the fourth lens may be positive.

In an embodiment, the second lens may have a positive refractive power or a negative refractive power.

In an embodiment, the fourth lens may have a positive refractive power or a negative refractive power.

Through the above configurations, the camera lens assembly may further possess at least one of the beneficial effects of large aperture, large field-of-view, high resolution, wide-angle, miniaturization, high imaging quality, balanced aberration and the like.

BRIEF DESCRIPTION OF THE DRAWINGS

The above and other advantages of implementations of the present disclosure will become apparent from the following detailed description with reference to the accompanying drawings, which are intended to illustrate the exemplary implementations of the present disclosure rather than limiting them. In the accompanying drawings:

FIG. 9 is a schematic structural diagram illustrating a camera lens assembly according to Embodiment 5 of the present disclosure;

FIGS. 10A-10D respectively illustrate a longitudinal aberration curve, an astigmatic curve, a lateral color curve, and a relative illumination curve of the camera lens assembly according to Embodiment 5;

DETAILED DESCRIPTION OF EMBODIMENTS

Figure 1:
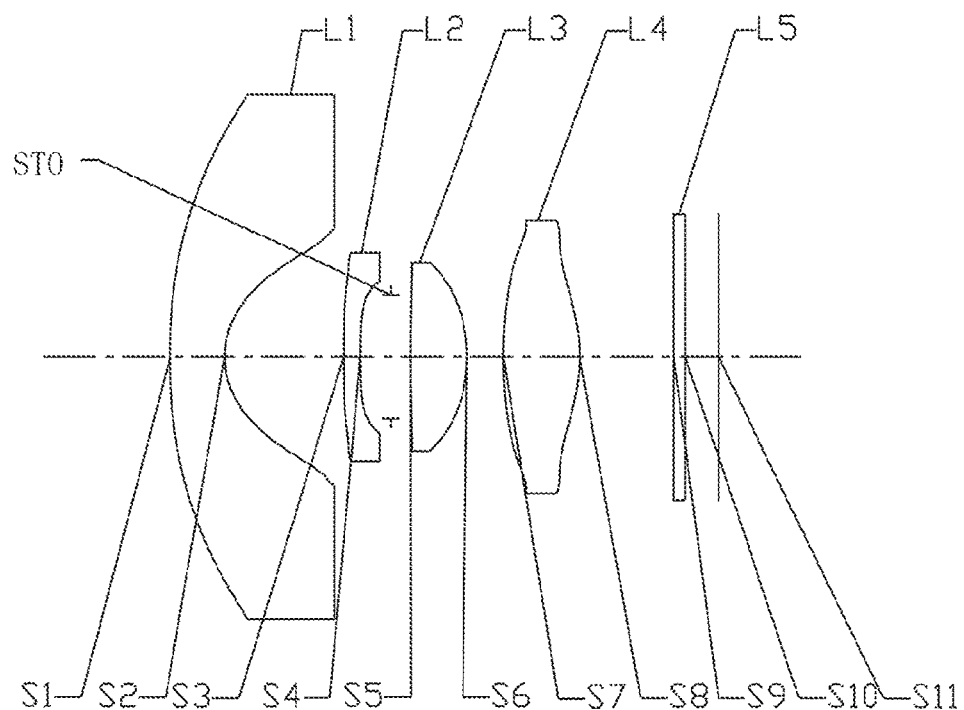
FIG. 1 is a schematic structural diagram illustrating a camera lens assembly according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions, such as "first," and "second" are only used to distinguish one feature from another, rather than represent any limitations to the features. Thus, the first lens discussed below may also be referred to as the second lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

It should be further understood that the terms "comprising," "including," "having" and variants thereof, when used in the specification, specify the presence of stated features, entities, steps, operations, elements and/or components, but do not exclude the presence or addition of one or more other features, entities, steps, operations, elements, components and/or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

As used herein, the terms "substantially," "about" and similar terms are used as a term of approximation and not as a term of degree, and are intended to account for the inherent deviations in measured or calculated values that would be recognized by those of ordinary skill in the art.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

In addition, the paraxial area refers to an area near the optical axis. The first lens is the lens closest to the object and the fourth lens is the lens closest to the photosensitive element. In this text, the surface closest to the object in each lens is referred to as the object-side surface, and the surface closest to the image plane in each lens is referred to as the image-side surface.

It should also be noted that the embodiments in the present disclosure and the features in the embodiments may be combined with each other on a non-conflict basis. The present disclosure will be described below in detail with reference to the accompanying drawings and in combination with the embodiments.

The present disclosure is further described below in combination with the specific embodiments.

The camera lens assembly according to exemplary implementations of the present disclosure includes, for example, four lenses (i.e., a first lens, a second lens, a third lens, and a fourth lens). The four lenses are sequentially arranged from the object side to the image side along the optical axis.

In an exemplary implementation, the first lens may have a negative refractive power, and an image-side surface of the first lens is a concave surface. The second lens may have a positive refractive power or a negative refractive power. The third lens may have a positive refractive power. The fourth lens may have a positive refractive power or a negative refractive power, and an image-side surface of the fourth lens is a convex surface. The wide-angle camera lens assembly adopts an anti-distance optical structure, the refractive power of the lens assembly I (the first lens, the second lens) is negative, and the refractive power of the lens assembly II (the third lens, the fourth lens) is positive. After the off-axis light is diffused through the negative lenses of the assembly I, the inclination angle of the light passing through the lenses of the assembly II becomes significantly smaller, so that the assembly II assumes a smaller field-of-view, which is beneficial to the correction of the off-axis aberration of the subsequent components, and the corresponding negative lens assembly I assumes a larger field-of-view. By reasonably controlling the positive and negative refractive power distribution on the lenses, low-order aberrations of the system may be effectively balanced and controlled so that the camera lens assembly obtains a better imaging quality, and the ultra-thin and large aperture characteristics may be realized.

In an exemplary implementation, an effective radius DT11 of an object-side surface of the first lens and half of a diagonal length ImgH of an effective pixel area on an electronic photosensitive element of the camera lens assembly may satisfy: $1.2<DT11/ImgH<2.6$, and more specifically, may further satisfy: $1.24 \leq DT11/ImgH \leq 2.56$. With such a configuration, the aperture of the first lens is reduced, and the processing performance of the first lens of the wide-angle lens assembly is improved.

In an exemplary implementation, an effective focal length f1 of the first lens and the effective focal length f of the camera lens assembly may satisfy: $-4<f1/f2<-2$, and more specifically, may further satisfy: $-2.84 \leq f1/f \leq -2.32$. With such a configuration, it is advantageous for increasing the sharing of the lens to the field-of-view, and reducing the inclination angle of light of subsequent lenses, thereby facilitating an aberration correction.

In an exemplary implementation, the effective focal length f of the camera lens assembly and the entrance pupil diameter EPD of the camera lens assembly may satisfy: $f/EPD \leq 1.8$, and more specifically, may further satisfy: $f/EPD \leq 1.19$. With such a configuration, the energy density of the image plane may be effectively improved on the image plane, which is advantageous for improving the signal-to-noise ratio of the output signal of the image-side sensor, that is, the accuracy of the measuring depth.

In an exemplary implementation, the half of the diagonal length ImgH of the effective pixel area on the electronic photosensitive element of the camera lens assembly and the effective focal length f of the camera lens assembly may satisfy: $Imgh/f>1$, and more specifically, may further satisfy: $Imgh/f \geq 1.19$. With such a configuration, the field-of-view may be improved while ensuring miniaturization, the wide-angle characteristic may be realized, the depth measurement range may be improved, and various types of aberrations may be effectively corrected, thereby improving the imaging quality of the camera lens assembly.

In an exemplary implementation, a radius of curvature R2 of the image-side surface of the first lens and the effective focal length f of the camera lens assembly may satisfy: $1<R2/f<1.5$, and more specifically, may further satisfy: $1.06 \leq R2/f \leq 1.38$. With such a configuration, the camera lens assembly can be ensured to have a good processing performance, and can also effectively assume a larger field-of-view, so that the inclination angle of light is significantly reduced after the wide-angle field-of-view light passes through the first lens, thereby facilitating the aberration correction.

In an exemplary implementation, it may satisfy: $0.2<CT1/(CT2+CT3+CT4)<0.5$, and more specifically, may further satisfy: $0.23 \leq CT1/(CT2+CT3+CT4) \leq 0.37$. CT1 is the center thickness of the first lens on the optical axis. CT2 is the center thickness of the second lens on the optical axis. CT3 is the center thickness of the third lens on the optical axis. CT4 is the center thickness of the fourth lens on the optical axis. By reasonably distributing the center thicknesses of the lenses, the processing technology of the lenses can be effectively ensured. Especially for the first lens which is high in the image-side curvature, the processing performance of the first lens cannot be easily ensured. By reasonably configuring the center thickness of the first lens, the thickness ratio of the lens may be reduced to optimize the processing performance.

In an exemplary implementation, it may satisfy: $2<T12/T23<4$, and more specifically, may further satisfy: $2.06 \leq T12/T23 \leq 3.75$. T12 is an air spacing distance between the first lens and the second lens on the optical axis. T23 is an air spacing distance between the second lens and the third lens on the optical axis. A larger air spacing distance is allocated between the first lens and the second lens, on the one hand, because the image-side surface of the first lens has a high curvature and a large sagittal height, and the assembly structure requires such allocation; on the other hand, it may also reduce the incident angle of light entering the second lens, which is conducive to the balance of aberrations.

In an exemplary implementation, an effective radius DT32 of an image-side surface of the third lens and an effective focal length f3 of the third lens may satisfy: $0.1<DT32/f3<0.6$, and more specifically, may further satisfy: $0.18 \leq DT32/f3 \leq 0.55$. With such a configuration, it is advantageous for improving the correction of the third lens to an aperture aberration of the full field-of-view, thereby improving the imaging quality.

In an exemplary implementation, it may satisfy: $0.3<\Sigma CT/TTL<0.6$, and more specifically, may further satisfy: $0.35 \leq \Sigma CT/TTL \leq 0.46$. $\Sigma CT$ is a sum of center thicknesses of the first lens to the fourth lens on the optical axis. TTL is a distance from the object-side surface of the first lens to the image plane on the optical axis. With such a configuration, it is advantageous for reducing the overall length of the system, and the increase in the distance between the lenses is advantageous for reducing the tolerance sensitivity and improving the quality and consistency of mass production lens assemblies.

In an exemplary implementation, it may satisfy: $0.9<SAG11/CT1<1.75$, and more specifically, may further satisfy: $0.93 \leq SAG11/CT1 \leq 1.71$. SAG11 is the distance from the intersection point of the object-side surface of the first lens and the optical axis to the effective radius vertex of the object-side surface of the first lens on the optical axis. CT1 is the center thickness of the first lens on the optical axis. By reasonably configuring the sagittal height of the object-side surface of the first lens and the center thickness of the first lens, it is advantageous for improving the processing performance of the first lens.

In an exemplary implementation, an infrared bandpass filter is disposed between the fourth lens and the image plane of the camera lens assembly. The bandpass filter works in a certain waveband, only a small band in the middle of the waveband is a high transmittance passband, and bands at both sides of the passband are high reflectance cutoff bands. The proper passage of the infrared band may help the system not to introduce the influence of chromatic aberrations, control the diameters of diffuse spots, and the infrared band is beneficial to eliminate the interference of ambient visible light, thereby improving the imaging quality of the lens assembly. With such a configuration, effective recognition of the camera lens assembly within the effective spectral range is ensured.

The infrared band is beneficial to not introduce the chromatic aberrations to the system, control the diameters of the diffuse spots, at the same time, the infrared band is advantageous for reducing the interference of the ambient visible light and improving the signal-to-noise ratio of the output signal of the image-side sensor.

In an exemplary implementation, the camera lens assembly may also be provided with an aperture STO to limit light beams, adjust the amount of light admitted and improve the imaging quality. The camera lens assembly according to the above implementations of the present disclosure may use multiple lenses, for example, four lenses as described in the preceding text. By reasonably allocating the refractive power, surface type of each lens, the center thickness of each lens and the spacing distance on the axis between the lenses, etc., it is possible to effectively enlarge the aperture of the camera lens assembly, reduce the system sensibility, ensure the miniaturization of the lens assembly and improve the imaging quality, thus making the camera lens assembly more conducive to the production and processing and may be applicable to portable electronic products. In the implementations of the present disclosure, at least one of the surfaces of the lenses is an aspheric mirror surface. The characteristic of the aspheric lens is: the curvature from the center of the lens to the periphery is continuously changing. Unlike the spherical lens with a constant curvature from the center of the lens to the periphery, the aspheric lens has a better radius-of-curvature characteristic, having advantages of improving the distortion aberration and improving the astigmatic aberration, capable of making the field of view larger and more realistic. The use of the aspheric lens can eliminate as much as possible the aberrations that occur during the imaging, thereby improving the imaging quality. In addition, the use of the aspheric lens may also effectively reduce the number of lenses in the optical system.

However, it should be understood by those skilled in the art that the various results and advantages described in the present specification may be obtained by changing the number of the lenses constituting the camera lens assembly without departing from the technical solution claimed by the present disclosure. For example, although the camera lens assembly having four lenses is described as an example in the implementations, the camera lens assembly is not limited to include four lenses. If desired, the camera lens assembly may also include other numbers of lenses.

Specific embodiments of the camera lens assembly that may be applied to the above implementations are further described below with reference to the accompanying drawings.

Embodiment 1

A camera lens assembly according to Embodiment 1 of the present disclosure is described below with reference to FIGS. 1-2D.

FIG. 1 is a schematic structural diagram illustrating the camera lens assembly according to Embodiment 1 of the present disclosure. As shown in FIG. 1, the camera lens assembly includes four lenses L1-L4 arranged in sequence from an object side to an image side along an optical axis. The first lens L1 has an object-side surface S1 and an image-side surface S2; the second lens L2 has an object-side surface S3 and an image-side surface S4; the third lens L3 has an object-side surface S5 and an image-side surface S6; and the fourth lens L4 has an object-side surface S7 and an image-side surface S8.

In the present embodiment, the first lens L1 may have a negative refractive power, and an image-side surface of the first lens is a concave surface. The second lens L2 may have a negative refractive power. The third lens L3 may have a positive refractive power. The fourth lens L4 may have a positive refractive power, and an image-side surface of the fourth lens is a convex surface.

In the camera lens assembly of the present embodiment, an aperture STO disposed between the second lens and the third lens is also included for limiting the light beams. The camera lens assembly according to Embodiment 1 may include an infrared bandpass filter L5 having an object-side surface S9 and an image-side surface S10, and the filter L5 may be used for correcting color deviations. Light from an object passes through the surfaces S1 to S10 sequentially and is finally imaged on an image plane S11.

Table 1 shows the surface type, the radius of curvature, the thickness, the material and the conic coefficient of each lens of the camera lens assembly in Embodiment 1.

TABLE 1

| surface number | surface type | radius of curvature | thickness | material refractive index | abbe number | conic coefficient |
|---|---|---|---|---|---|---|
| OBJ | spherical | infinite | infinite | | | |
| S1 | aspheric | 12.1465 | 1.0000 | 1.53 | 55.8 | 1.6067 |
| S2 | aspheric | 1.3397 | 2.1678 | | | −1.8581 |
| S3 | aspheric | 30.6353 | 0.3000 | 1.62 | 23.5 | 0.0000 |
| S4 | aspheric | 13.5325 | 0.5548 | | | 0.0000 |
| STO | spherical | infinite | 0.3573 | | | |
| S5 | aspheric | 30.5977 | 1.0396 | 1.53 | 55.8 | −199.6758 |
| S6 | aspheric | −2.4003 | 0.6660 | | | −0.0962 |
| S7 | aspheric | 7.4365 | 1.3874 | 1.62 | 23.5 | −23.6703 |
| S8 | aspheric | −2.7699 | 1.7089 | | | 0.0000 |
| S9 | spherical | infinite | 0.2100 | 1.52 | 64.2 | |
| S10 | spherical | infinite | 0.6082 | | | |
| S11 | spherical | infinite | | | | |

As may be obtained from Table 1, it satisfies: CT1/(CT2+CT3+CT4)=0.37. CT1 is the center thickness of the first lens on the optical axis. CT2 is the center thickness of the second lens on the optical axis. CT3 is the center thickness of the third lens on the optical axis. CT4 is the center thickness of the fourth lens on the optical axis. It satisfies: T12/T23=2.38. T12 is the air spacing distance between the first lens and the second lens on the optical axis. T23 is the air spacing distance between the second lens and the third lens on the optical axis. It satisfies: ΣCT/TTL=0.37. ΣCT is a sum of center thicknesses of the first lens to the fourth lens on the optical axis. TTL is the distance from the object-side surface of the first lens to the image plane on the optical axis.

In this embodiment, four lenses are used as an example. By reasonably distributing the focal lengths and the surface types of the lenses, the aperture of the lens assembly is effectively enlarged, the total length of the lens assembly is shortened, and the large aperture and the miniaturization of the lens assembly is ensured. At the same time, various types of aberrations are corrected, and the resolution and the imaging quality of the lens assembly are improved. The surface type x of each aspheric surface is defined by the following formula:

$$x = \frac{ch^2}{1+\sqrt{1-(k+1)c^2h^2}} + \sum A_i h^i \quad (1)$$

Here, x is the distance sagittal height to the vertex of the aspheric surface when the aspheric surface is at a position of a height h along the optical axis; c is the paraxial curvature of the aspheric surface, and c=1/R (i.e., the paraxial curvature c is the reciprocal of the radius of curvature R in Table 1 above); k is the conic coefficient (given in Table 1 above); and $A_i$ is the correction coefficient of the $i^{th}$ order of the aspheric surface. Table 2 below shows the high-order coefficients $A_4$, $A_6$, $A_8$, $A_{10}$, $A_{12}$, $A_{14}$, and $A_{16}$ applicable to the aspheric surfaces S1-S8 in Embodiment 1.

TABLE 2

| surface number | A4 | A6 | A8 | A10 | A12 | A14 | A16 |
|---|---|---|---|---|---|---|---|
| S1 | 9.0896E−03 | −1.8572E−03 | 2.2576E−04 | −1.6382E−05 | 6.9608E−07 | −1.5659E−08 | 1.3773E−10 |
| S2 | 6.6559E−02 | 1.1050E−02 | −1.1686E−02 | 1.5893E−03 | 1.3646E−03 | −5.3140E−04 | 5.1939E−05 |
| S3 | −1.5764E−02 | 7.6595E−02 | −1.0538E−01 | 9.1548E−02 | −4.5284E−02 | 1.1060E−02 | −1.0276E−03 |
| S4 | 3.6271E−02 | 3.5495E−02 | 2.4384E−02 | −9.8866E−02 | 1.3796E−01 | −8.1950E−02 | 1.8408E−02 |
| S5 | −3.4757E−03 | −2.3235E−03 | 9.9880E−03 | −1.1401E−02 | 5.8129E−03 | −1.3271E−03 | 1.0943E−04 |
| S6 | −1.9772E−03 | −4.8667E−03 | 9.1691E−05 | 1.1064E−03 | −7.0374E−04 | 3.6071E−05 | 2.8070E−05 |
| S7 | 8.4778E−03 | 6.7589E−04 | −4.8631E−04 | 5.0058E−04 | −2.1360E−04 | 3.9971E−05 | −3.0084E−06 |
| S8 | 2.6080E−02 | −1.0049E−03 | 1.0938E−03 | −1.9456E−04 | 5.4199E−05 | −1.5228E−05 | 1.2409E−06 |

Table 3 below shows the effective focal lengths f1-f4 of the lenses, the effective focal length f of the camera lens assembly, the half of the diagonal length ImgH of the effective pixel area on the electronic photosensitive element of the camera lens assembly and the distance TTL from the object-side surface S1 of the first lens L1 to the image plane S11 of the camera lens assembly on the optical axis in Embodiment 1.

TABLE 3

| | parameter | | | | | | |
|---|---|---|---|---|---|---|---|
| | ImgH (mm) | f (mm) | f1 (mm) | f2 (mm) | f3 (mm) | f4 (mm) | TTL (mm) |
| numerical value | 2.47 | 1.26 | −2.93 | −39.34 | 4.23 | 3.43 | 10.00 |

As may be obtained from Table 3, the effective focal length f1 of the first lens and the effective focal length f of the camera lens assembly satisfy: f1/f=−2.32. The half of the diagonal length ImgH of the effective pixel area on the electronic photosensitive element of the camera lens assembly and the effective focal length f of the camera lens assembly satisfy: Imgh/f=1.96.

In combination with the above Table 1 and Table 3, in this embodiment, the effective focal length f of the camera lens assembly and the entrance pupil diameter EPD of the camera lens assembly satisfy: f/EPD=1.19. The radius of curvature R2 of the image-side surface of the first lens and the effective focal length f of the camera lens assembly satisfy: R2/f=1.06. The effective radius DT11 of the object-side surface of the first lens and the half of the diagonal length ImgH of the effective pixel area on the electronic photosensitive element of the camera lens assembly satisfy: DT11/ImgH=1.81. The effective radius DT32 of the image-side surface of the third lens and the effective focal length f3 of the third lens satisfy: DT32/f3=0.38. It satisfies: SAG11/CT1=1.42. Here, SAG11 is the distance from the intersection point of the object-side surface of the first lens and the optical axis to the effective radius vertex of the object-side surface of the first lens on the optical axis, and CT1 is the center thickness of the first lens on the optical axis.

Figure 2A:
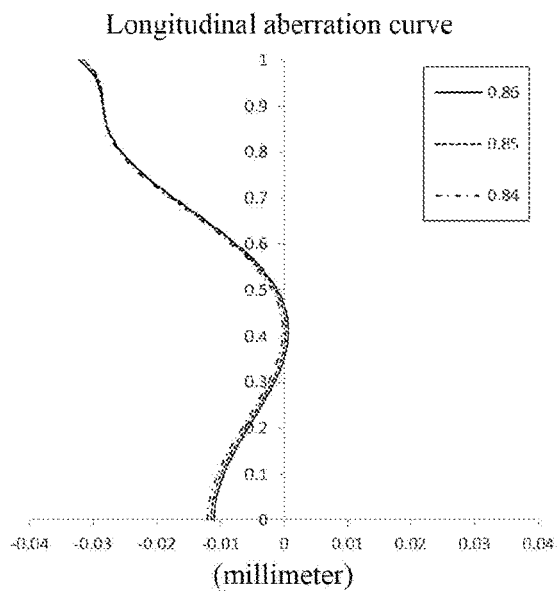
FIGS. 2A-2D respectively illustrate a longitudinal aberration curve, an astigmatic curve, a lateral color curve, and a relative illumination curve of the camera lens assembly according to Embodiment 1.
Figure 2B:
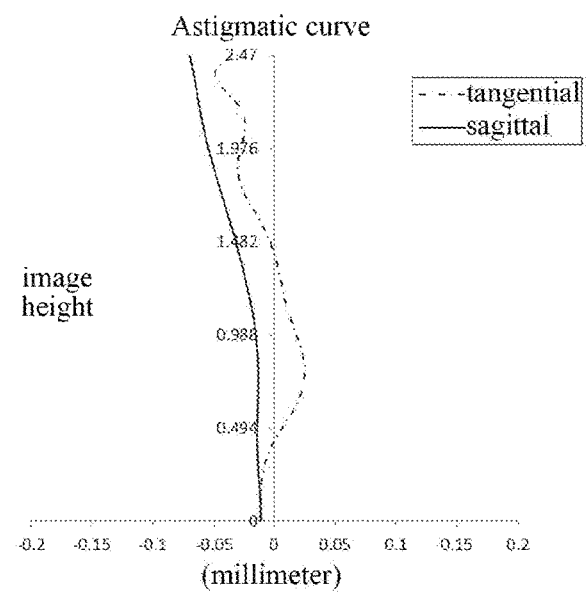
Figure 2C:
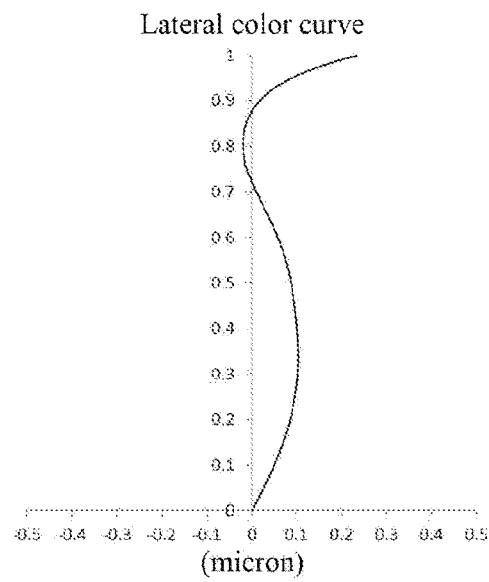
Figure 2D:
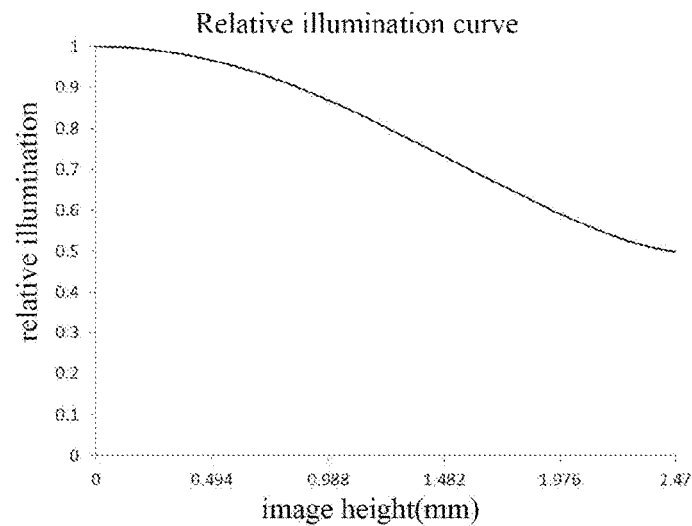

FIG. 2A shows the longitudinal aberration curve of the camera lens assembly according to Embodiment 1, representing deviations of converged focal points of light of different wavelengths after passing through the camera lens assembly. FIG. 2B shows the astigmatic curve of the camera lens assembly according to Embodiment 1, representing a curvature of the tangential image plane and a curvature of the sagittal image plane. FIG. 2C shows the lateral color curve of the camera lens assembly according to Embodiment 1, representing deviations of different image heights on the image plane after light passes through the camera lens assembly. FIG. 2D shows the relative illumination curve of the camera lens assembly according to Embodiment 1, representing the brightness of the image on the optical axis of the lens assembly, that is, the center of the screen. It can be seen from FIG. 2A to FIG. 2D that the camera lens assembly given in Embodiment 1 can achieve a good imaging quality.

Embodiment 2

A camera lens assembly according to Embodiment 2 of the present disclosure is described below with reference to FIGS. 3-4D. Except for the parameters of the lenses of the camera lens assembly, for example, except for the radius of curvature, the thickness, the conic coefficient, the effective focal length, of each lens, the spacing distance on the axis, the higher-order coefficients of each surface, and the like, the camera lens assembly described in the present Embodiment 2 and the following embodiments is the same in arrangement and structure as that of the camera lens assembly described in Embodiment 1. For the purpose of brevity, the description of parts similar to those in Embodiment 1 will be omitted.

Figure 3:
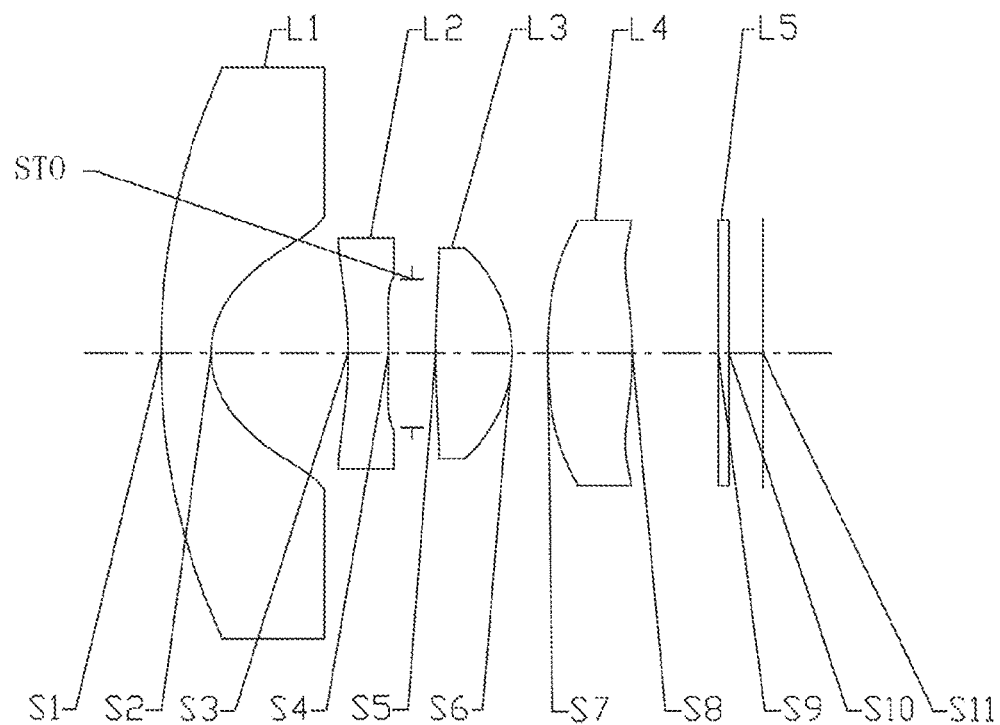
FIG. 3 is a schematic structural diagram illustrating a camera lens assembly according to Embodiment 2 of the present disclosure.

FIG. 3 is a schematic structural diagram illustrating the camera lens assembly according to Embodiment 2 of the present disclosure. As shown in FIG. 3, the camera lens assembly according to Embodiment 2 includes the first to fourth lenses L1-L4 respectively having an object-side surface and an image-side surface.

In the present embodiment, the first lens L1 may have a negative refractive power, and an image-side surface of the first lens is a concave surface. The second lens L2 may have a negative refractive power. The third lens L3 may have a positive refractive power. The fourth lens L4 may have a positive refractive power, and an image-side surface of the fourth lens is a convex surface.

Table 4 shows the surface type, the radius of curvature, the thickness, the material and the conic coefficient of each lens of the camera lens assembly in Embodiment 2. Table 5 shows the high-order coefficients applicable to each aspheric surface in Embodiment 2. Table 6 shows the effective focal lengths f1-f4 of the lenses, the effective focal length f of the camera lens assembly, the half of the diagonal length ImgH of the effective pixel area on the electronic photosensitive element of the camera lens assembly and the distance TTL from the object-side surface S1 of the first lens L1 to the image plane S11 of the camera lens assembly on the optical axis in Embodiment 2. The surface type of each aspheric surface may be defined by the formula (1) given in Embodiment 1.

TABLE 4

| surface number | surface type | radius of curvature | thickness | material refractive index | abbe number | conic coefficient |
|---|---|---|---|---|---|---|
| OBJ | spherical | infinite | infinite | | | |
| S1 | aspheric | 16.6169 | 1.0000 | 1.53 | 55.8 | −4.6816 |
| S2 | aspheric | 1.5137 | 2.7320 | | | −1.8432 |
| S3 | aspheric | −9.4857 | 0.8017 | 1.62 | 23.5 | 0.0000 |
| S4 | aspheric | −18.9104 | 0.4691 | | | 0.0000 |
| STO | spherical | infinite | 0.4676 | | | |
| S5 | aspheric | 13.3716 | 1.5329 | 1.53 | 55.8 | −8.4774 |
| S6 | aspheric | −2.3495 | 0.7100 | | | −0.3875 |
| S7 | aspheric | 8.0210 | 1.6870 | 1.62 | 23.5 | 1.1090 |
| S8 | aspheric | −5.0401 | 1.7092 | | | 0.0000 |
| S9 | spherical | infinite | 0.2100 | 1.52 | 64.2 | |
| S10 | spherical | infinite | 0.6804 | | | |
| S11 | spherical | infinite | | | | |

TABLE 5

| surface number | A4 | A6 | A8 | A10 | A12 | A14 | A16 |
|---|---|---|---|---|---|---|---|
| S1 | 3.2513E−03 | −4.5464E−04 | 4.2215E−05 | −2.4388E−06 | 8.5923E−08 | −1.6933E−09 | 1.4186E−11 |
| S2 | 4.9848E−02 | −1.3412E−02 | 1.0110E−02 | −5.0566E−03 | 1.4037E−03 | −1.9848E−04 | 1.0821E−05 |
| S3 | −1.4665E−02 | 9.9528E−03 | −4.6862E−03 | 2.5192E−03 | −8.7415E−04 | 1.4724E−04 | −9.1191E−06 |
| S4 | 6.2869E−03 | 2.7600E−02 | −3.7309E−02 | 4.0859E−02 | −2.0944E−02 | 4.4792E−03 | −7.9166E−05 |
| S5 | −9.0817E−03 | 2.7329E−03 | 1.0834E−04 | −8.7680E−04 | 4.4106E−04 | −8.5540E−05 | 5.5642E−06 |

TABLE 5-continued

| surface number | A4 | A6 | A8 | A10 | A12 | A14 | A16 |
|---|---|---|---|---|---|---|---|
| S6 | 2.8477E−03 | −1.5243E−03 | −1.4190E−03 | 1.5157E−03 | −6.4996E−04 | 1.2563E−04 | −9.1310E−06 |
| S7 | 7.4740E−03 | −3.1040E−04 | 4.1243E−05 | 7.9709E−05 | −3.6761E−05 | 5.9184E−06 | −3.6407E−07 |
| S8 | 1.7515E−02 | −1.3089E−03 | 1.2461E−03 | −4.1902E−04 | 9.5175E−05 | −1.3557E−05 | 7.5094E−07 |

TABLE 6

| parameter | | | | | | |
|---|---|---|---|---|---|---|
| ImgH (mm) | f (mm) | f1 (mm) | f2 (mm) | f3 (mm) | f4 (mm) | TTL (mm) |
| numerical value | | | | | | |
| 2.45 | 1.33 | −3.21 | −31.72 | 3.89 | 5.25 | 12.00 |

Figure 4A:
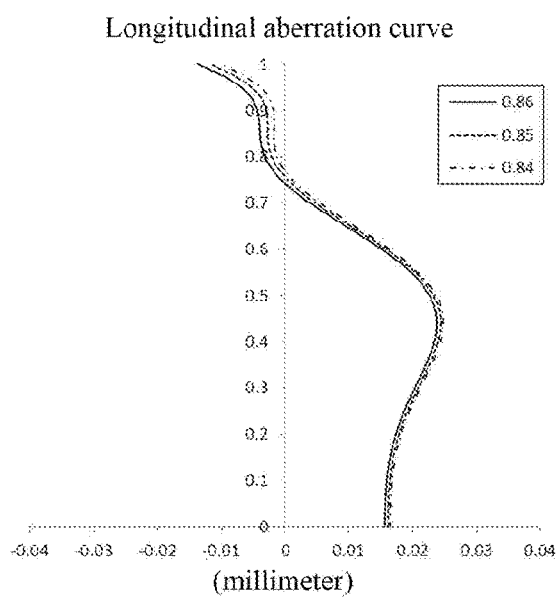
FIGS. 4A-4D respectively illustrate a longitudinal aberration curve, an astigmatic curve, a lateral color curve, and a relative illumination curve of the camera lens assembly according to Embodiment 2.
Figure 4B:
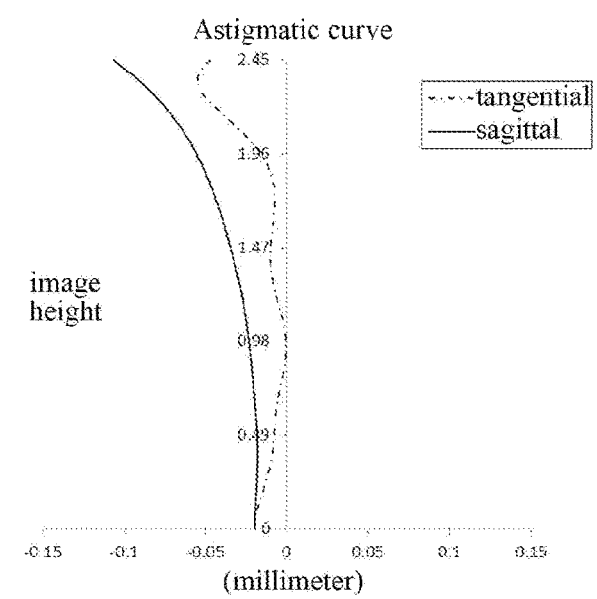
Figure 4C:
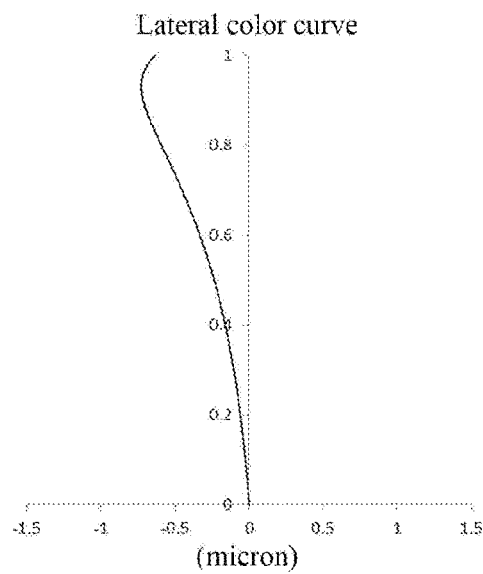
Figure 4D:
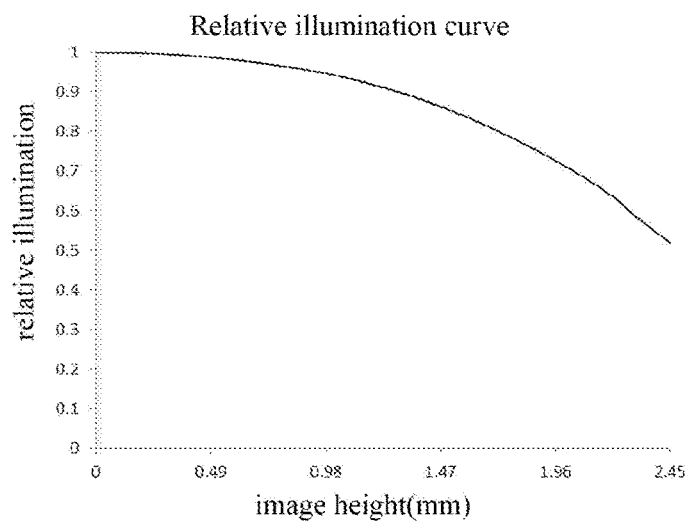

FIG. 4A shows the longitudinal aberration curve of the camera lens assembly according to Embodiment 2, representing deviations of converged focal points of light of different wavelengths after passing through the camera lens assembly. FIG. 4B shows the astigmatic curve of the camera lens assembly according to Embodiment 2, representing a curvature of the tangential image plane and a curvature of the sagittal image plane. FIG. 4C shows the lateral color curve of the camera lens assembly according to Embodiment 2, representing deviations of different image heights on the image plane after light passes through the camera lens assembly. FIG. 4D shows the relative illumination curve of the camera lens assembly according to Embodiment 2, representing the brightness of the image on the optical axis of the lens assembly, that is, the center of the screen. It can be seen from FIG. 4A to FIG. 4D that the camera lens assembly given in Embodiment 2 can achieve a good imaging quality.

Embodiment 3

A camera lens assembly according to Embodiment 3 of the present disclosure is described below with reference to FIGS. 5-6D.

Figure 5:
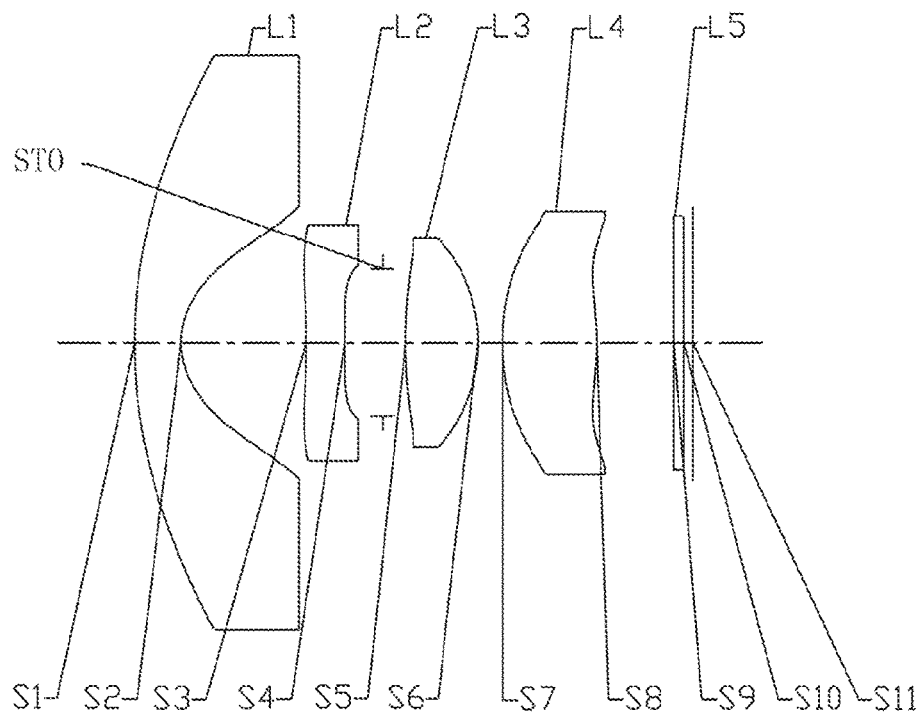
FIG. 5 is a schematic structural diagram illustrating a camera lens assembly according to Embodiment 3 of the present disclosure.

FIG. 5 is a schematic structural diagram illustrating the camera lens assembly according to Embodiment 3 of the present disclosure. As shown in FIG. 5, the camera lens assembly according to Embodiment 3 includes the first to fourth lenses L1-L4 respectively having an object-side surface and an image-side surface.

In the present embodiment, the first lens L1 may have a negative refractive power, and an image-side surface of the first lens is a concave surface. The second lens L2 may have a negative refractive power. The third lens L3 may have a positive refractive power. The fourth lens L4 may have a positive refractive power, and an image-side surface of the fourth lens is a convex surface.

Table 7 shows the surface type, the radius of curvature, the thickness, the material and the conic coefficient of each lens of the camera lens assembly in Embodiment 3. Table 8 shows the high-order coefficients applicable to each aspheric surface in Embodiment 3. Table 9 shows the effective focal lengths f1-f4 of the lenses, the effective focal length f of the camera lens assembly, the half of the diagonal length ImgH of the effective pixel area on the electronic photosensitive element of the camera lens assembly and the distance TTL from the object-side surface S1 of the first lens L1 to the image plane S11 of the camera lens assembly on the optical axis in Embodiment 3. The surface type of each aspheric surface may be defined by the formula (1) given in Embodiment 1.

TABLE 7

| surface number | surface type | radius of curvature | thickness | material refractive index | material abbe number | conic coefficient |
|---|---|---|---|---|---|---|
| OBJ | spherical | infinite | infinite | | | |
| S1 | aspheric | 9.8139 | 1.0000 | 1.53 | 55.8 | −3.6882 |
| S2 | aspheric | 1.3475 | 2.6615 | | | −1.8703 |
| S3 | aspheric | −18.7022 | 0.8215 | 1.62 | 23.5 | 0.0000 |
| S4 | aspheric | 221.1874 | 0.8042 | | | 0.0000 |
| STO | spherical | infinite | 0.4885 | | | |
| S5 | aspheric | 8.5791 | 1.5508 | 1.53 | 55.8 | 4.5836 |
| S6 | aspheric | −2.7254 | 0.5245 | | | −0.3936 |
| S7 | aspheric | 4.2252 | 2.0000 | 1.62 | 23.5 | −0.9322 |
| S8 | aspheric | −5.2457 | 1.6390 | | | 0.0000 |
| S9 | spherical | infinite | 0.2100 | 1.52 | 64.2 | |
| S10 | spherical | infinite | 0.2007 | | | |
| S11 | spherical | infinite | | | | |

TABLE 8

| surface number | A4 | A6 | A8 | A10 | A12 | A14 | A16 |
|---|---|---|---|---|---|---|---|
| S1 | 3.0639E−03 | −4.2897E−04 | 3.6579E−05 | −1.8891E−06 | 5.7210E−08 | −9.2621E−10 | 6.1598E−12 |
| S2 | 3.3020E−02 | 2.1438E−02 | −1.7283E−02 | 6.3738E−03 | −1.2765E−03 | 1.2743E−04 | −4.9399E−06 |
| S3 | −2.8101E−03 | 4.3988E−03 | −6.2575E−04 | −9.6177E−05 | 5.1653E−05 | −6.9934E−06 | 3.1522E−07 |
| S4 | 3.2139E−02 | −2.5600E−02 | 5.9625E−02 | −5.6882E−02 | 3.2139E−02 | −9.7884E−03 | 1.3494E−03 |

TABLE 8-continued

| surface number | A4 | A6 | A8 | A10 | A12 | A14 | A16 |
|---|---|---|---|---|---|---|---|
| S5 | −4.5855E−03 | 4.7866E−03 | −3.4627E−03 | 7.0056E−04 | 2.4138E−04 | −1.3439E−04 | 1.7204E−05 |
| S6 | 7.0539E−03 | −8.9427E−03 | 5.4854E−03 | −2.3146E−03 | 5.6748E−04 | −7.4668E−05 | 4.0973E−06 |
| S7 | 1.0550E−02 | −4.4393E−03 | 2.6367E−03 | −9.6763E−04 | 2.0214E−04 | −2.2522E−05 | 1.0174E−06 |
| S8 | 3.4444E−02 | −8.0495E−03 | 5.5222E−03 | −2.0976E−03 | 4.4774E−04 | −5.3310E−05 | 2.6785E−06 |

TABLE 9

| | parameter | | | | | | |
|---|---|---|---|---|---|---|---|
| | ImgH (mm) | F (mm) | f1 (mm) | f2 (mm) | f3 (mm) | f4 (mm) | TTL (mm) |
| numerical value | 2.47 | 1.11 | −3.06 | −27.76 | 4.09 | 4.10 | 11.90 |

Figures 6A, 6B:
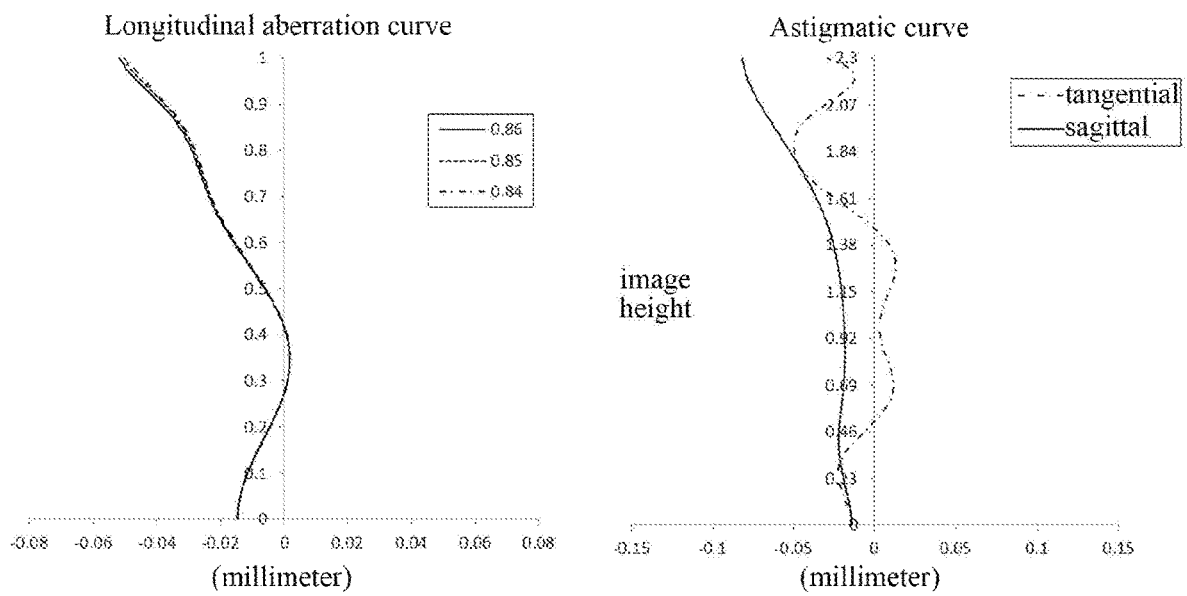
FIGS. 6A-6D respectively illustrate a longitudinal aberration curve, an astigmatic curve, a lateral color curve, and a relative illumination curve of the camera lens assembly according to Embodiment 3.
Figure 6C:
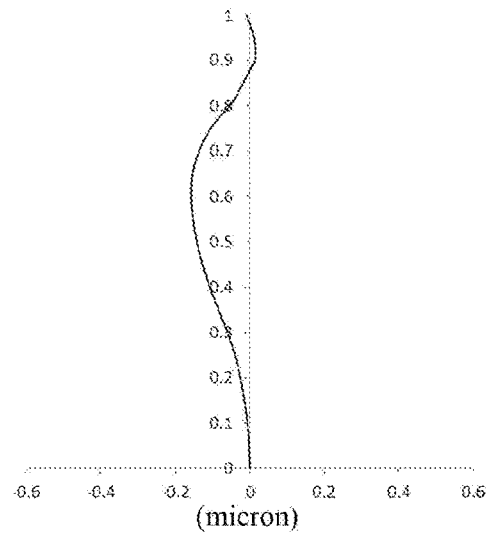
Figure 6D:
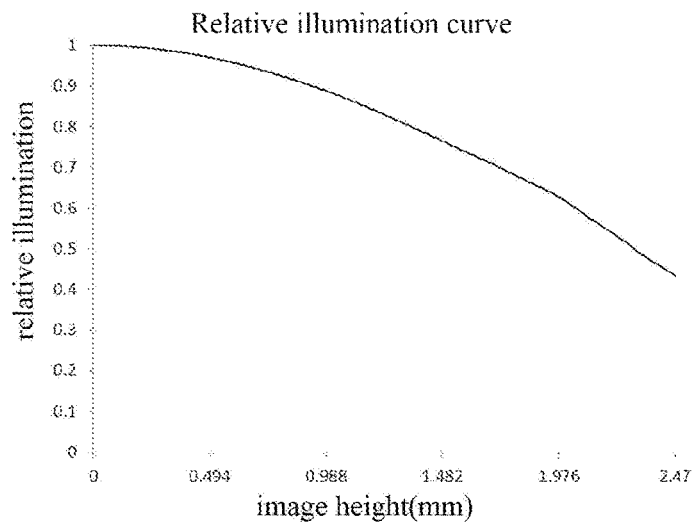

FIG. 6A shows the longitudinal aberration curve of the camera lens assembly according to Embodiment 3, representing deviations of converged focal points of light of different wavelengths after passing through the camera lens assembly. FIG. 6B shows the astigmatic curve of the camera lens assembly according to Embodiment 3, representing a curvature of the tangential image plane and a curvature of the sagittal image plane. FIG. 6C shows the lateral color curve of the camera lens assembly according to Embodiment 3, representing deviations of different image heights on the image plane after light passes through the camera lens assembly. FIG. 6D shows the relative illumination curve of the camera lens assembly according to Embodiment 3, representing the brightness of the image on the optical axis of the lens assembly, that is, the center of the screen. It can be seen from FIG. 6A to FIG. 6D that the camera lens assembly given in Embodiment 3 can achieve a good imaging quality.

Embodiment 4

A camera lens assembly according to Embodiment 4 of the present disclosure is described below with reference to FIGS. 7-8D.

Figure 7:
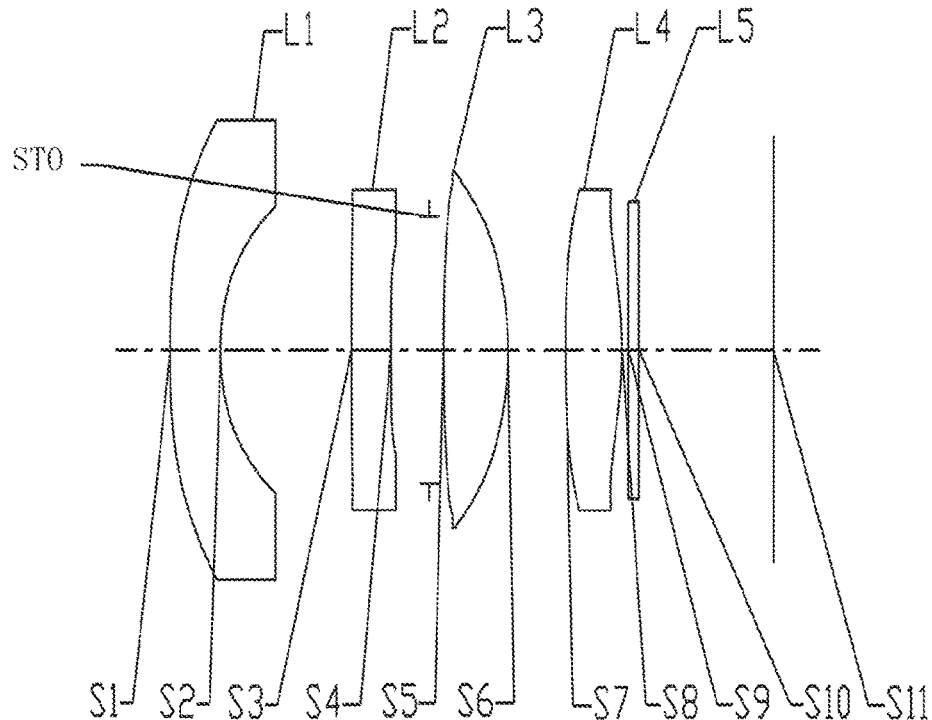
FIG. 7 is a schematic structural diagram illustrating a camera lens assembly according to Embodiment 4 of the present disclosure.

FIG. 7 is a schematic structural diagram illustrating the camera lens assembly according to Embodiment 4 of the present disclosure. As shown in FIG. 7, the camera lens assembly according to Embodiment 4 includes the first to fourth lenses L1-L4 respectively having an object-side surface and an image-side surface.

In the present embodiment, the first lens L1 may have a negative refractive power, and an image-side surface of the first lens is a concave surface. The second lens L2 may have a positive refractive power. The third lens L3 may have a positive refractive power. The fourth lens L4 may have a positive refractive power, and an image-side surface of the fourth lens is a convex surface.

Table 10 shows the surface type, the radius of curvature, the thickness, the material and the conic coefficient of each lens of the camera lens assembly in Embodiment 4. Table 11 shows the high-order coefficients applicable to each aspheric surface in Embodiment 4. Table 12 shows the effective focal lengths f1-f4 of the lenses, the effective focal length f of the camera lens assembly, the half of the diagonal length ImgH of the effective pixel area on the electronic photosensitive element of the camera lens assembly and the distance TTL from the object-side surface S1 of the first lens L1 to the image plane S11 of the camera lens assembly on the optical axis in Embodiment 4. The surface type of each aspheric surface may be defined by the formula (1) given in Embodiment 1.

TABLE 10

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | 12.4724 | 1.0000 | 1.53 | 55.8 | −2.8709 |
| S2 | aspheric | 2.1626 | 2.6026 | | | −1.5788 |
| S3 | aspheric | 317.6664 | 0.7815 | 1.62 | 23.5 | 0.0000 |
| S4 | aspheric | 3905.6560 | 0.7630 | | | 0.0000 |
| STO | spherical | infinite | 0.2762 | | | |
| S5 | aspheric | 20.4464 | 1.2944 | 1.53 | 55.8 | 95.0000 |
| S6 | aspheric | −2.9633 | 1.1446 | | | −0.2743 |
| S7 | aspheric | 18.1160 | 1.1160 | 1.62 | 23.5 | 14.3646 |
| S8 | aspheric | −3.5623 | 0.1274 | | | 0.0000 |
| S9 | spherical | infinite | 0.2100 | 1.52 | 64.2 | |
| S10 | spherical | infinite | 2.6842 | | | |
| S11 | spherical | infinite | | | | |

TABLE 11

| surface number | A4 | A6 | A8 | A10 | A12 | A14 | A16 |
|---|---|---|---|---|---|---|---|
| S1 | 2.1999E−02 | −3.5837E−03 | 4.4780E−04 | −3.6898E−05 | 1.8079E−06 | −4.7334E−08 | 4.6952E−10 |
| S2 | 3.7302E−02 | 1.7924E−02 | −1.5643E−02 | 6.1205E−03 | −1.2507E−03 | 1.2179E−04 | −4.4498E−06 |
| S3 | −4.1544E−03 | 1.3172E−02 | −1.3595E−02 | 7.9776E−03 | −2.5793E−03 | 4.1258E−04 | −2.5205E−05 |
| S4 | 2.0329E−02 | 8.3805E−03 | −1.1321E−02 | 1.3447E−02 | −6.5679E−03 | 1.3356E−03 | −3.4014E−05 |
| S5 | −4.5739E−04 | 5.1435E−03 | −4.9727E−03 | 2.3755E−03 | −6.7083E−04 | 1.0378E−04 | −6.5718E−06 |
| S6 | 2.2160E−03 | −3.0827E−03 | 1.6944E−03 | −9.2409E−04 | 2.3715E−04 | −3.0226E−05 | 1.8193E−06 |
| S7 | 8.4882E−03 | 8.3795E−04 | 7.4303E−05 | −6.8348E−05 | −1.4920E−06 | 3.1640E−06 | −5.0240E−07 |
| S8 | 2.2216E−02 | −1.9216E−03 | 2.7897E−03 | −1.2830E−03 | 3.4575E−04 | −5.2337E−05 | 3.1082E−06 |

TABLE 12

| | parameter | | | | | | |
|---|---|---|---|---|---|---|---|
| | ImgH (mm) | f (mm) | f1 (mm) | f2 (mm) | f3 (mm) | f4 (mm) | TTL (mm) |
| numerical value | 2.32 | 1.95 | −5.09 | 557.41 | 4.97 | 4.90 | 12.00 |

Figure 8A:
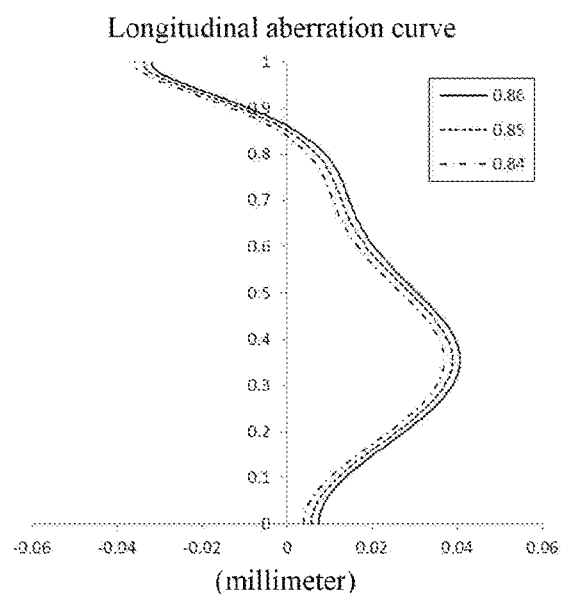
FIGS. 8A-8D respectively illustrate a longitudinal aberration curve, an astigmatic curve, a lateral color curve, and a relative illumination curve of the camera lens assembly according to Embodiment 4.
Figure 8B:
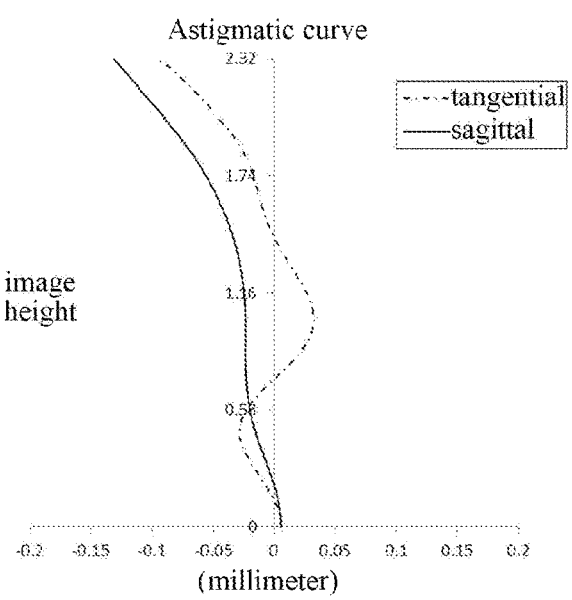
Figure 8C:
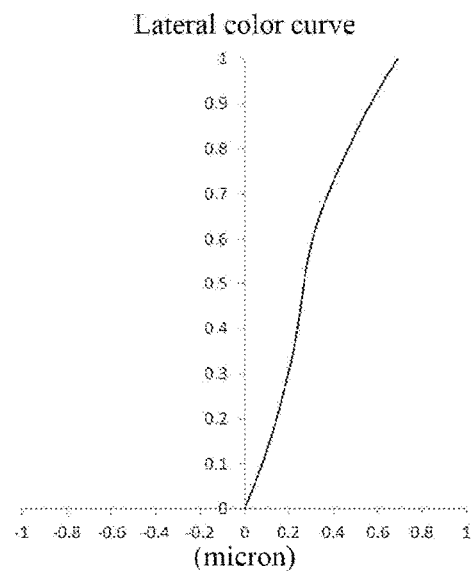
Figure 8D:
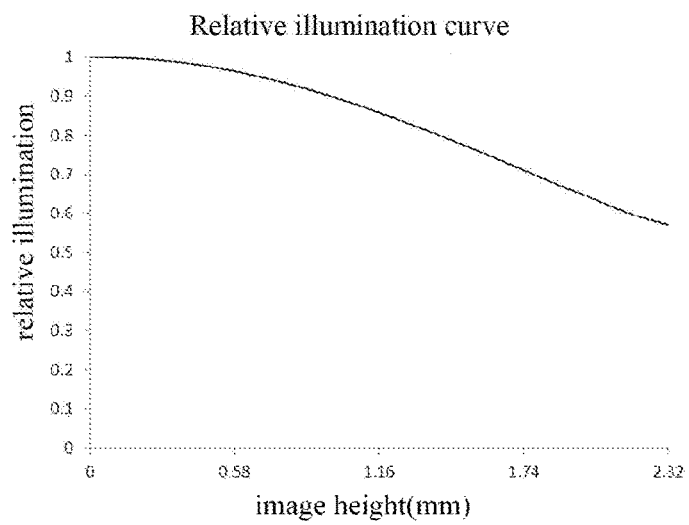

FIG. 8A shows the longitudinal aberration curve of the camera lens assembly according to Embodiment 4, representing deviations of converged focal points of light of different wavelengths after passing through the camera lens assembly. FIG. 8B shows the astigmatic curve of the camera lens assembly according to Embodiment 4, representing a curvature of the tangential image plane and a curvature of the sagittal image plane. FIG. 8C shows the lateral color curve of the camera lens assembly according to Embodiment 4, representing deviations of different image heights on the image plane after light passes through the camera lens assembly. FIG. 8D shows the relative illumination curve of the camera lens assembly according to Embodiment 4, representing the brightness of the image on the optical axis of the lens assembly, that is, the center of the screen. It can be seen from FIG. 8A to FIG. 8D that the camera lens assembly given in Embodiment 4 can achieve a good imaging quality.

Embodiment 5

A camera lens assembly according to Embodiment 5 of the present disclosure is described below with reference to FIGS. 9-10D.

FIG. 9 is a schematic structural diagram illustrating the camera lens assembly according to Embodiment 5 of the present disclosure. As shown in FIG. 9, the camera lens assembly according to Embodiment 5 includes the first to fourth lenses L1-L4 respectively having an object-side surface and an image-side surface.

In the present embodiment, the first lens L1 may have a negative refractive power, and an image-side surface of the first lens is a concave surface. The second lens L2 may have a negative refractive power. The third lens L3 may have a positive refractive power. The fourth lens L4 may have a positive refractive power, and an image-side surface of the fourth lens is a convex surface.

Table 13 shows the surface type, the radius of curvature, the thickness, the material and the conic coefficient of each lens of the camera lens assembly in Embodiment 5. Table 14 shows the high-order coefficients applicable to each aspheric surface in Embodiment 5. Table 15 shows the effective focal lengths f1-f4 of the lenses, the effective focal length f of the camera lens assembly, the half of the diagonal length ImgH of the effective pixel area on the electronic photosensitive element of the camera lens assembly and the distance TTL from the object-side surface S1 of the first lens L1 to the image plane S11 of the camera lens assembly on the optical axis in Embodiment 5. The surface type of each aspheric surface may be defined by the formula (1) given in Embodiment 1.

TABLE 13

| surface number | surface type | radius of curvature | thickness | material refractive index | abbe number | conic coefficient |
|---|---|---|---|---|---|---|
| OBJ | spherical | infinite | infinite | | | |
| S1 | aspheric | 20.9708 | 1.0000 | 1.53 | 55.8 | 2.6630 |
| S2 | aspheric | 1.4743 | 2.4927 | | | −1.8190 |
| S3 | aspheric | −321.7928 | 0.5590 | 1.62 | 23.5 | 0.0000 |
| S4 | aspheric | 7.3540 | 0.7570 | | | 0.0000 |
| STO | spherical | infinite | 0.3126 | | | |
| S5 | aspheric | 11.2834 | 1.6928 | 1.53 | 55.8 | 0.5069 |
| S6 | aspheric | −2.0655 | 0.5199 | | | −0.3625 |
| S7 | aspheric | 4.1947 | 1.9998 | 1.62 | 23.5 | −0.4314 |
| S8 | aspheric | −6.0219 | 1.5488 | | | 0.0000 |
| S9 | spherical | infinite | 0.2100 | 1.52 | 64.2 | |
| S10 | spherical | infinite | 0.2000 | | | |
| S11 | spherical | infinite | | | | |

TABLE 14

| surface number | A4 | A6 | A8 | A10 | A12 | A14 | A16 |
|---|---|---|---|---|---|---|---|
| S1 | 2.1384E−03 | −2.2186E−04 | 1.6081E−05 | −7.2246E−07 | 1.9544E−08 | −2.9176E−10 | 1.8335E−12 |
| S2 | 4.9694E−02 | −1.8166E−02 | 1.0744E−02 | −4.0936E−03 | 8.7618E−04 | −9.6852E−05 | 4.2168E−06 |
| S3 | 3.0641E−03 | 6.0570E−03 | 5.2056E−03 | −6.4292E−03 | 2.7779E−03 | −5.6026E−04 | 4.2898E−05 |
| S4 | 4.1470E−02 | 5.4833E−02 | −1.5873E−01 | 3.7294E−01 | −4.2781E−01 | 2.4066E−01 | −5.1376E−02 |
| S5 | −7.3072E−03 | 1.4736E−02 | −3.1459E−02 | 3.1680E−02 | −1.6989E−02 | 4.6970E−03 | −5.2720E−04 |
| S6 | 6.5842E−03 | −1.0501E−02 | 1.0133E−02 | −6.6365E−03 | 2.3348E−03 | −4.1229E−04 | 2.8803E−05 |
| S7 | 6.2176E−03 | −6.7460E−04 | 7.0277E−05 | −1.1874E−05 | −1.4441E−06 | 8.0554E−07 | −6.5654E−08 |
| S8 | 2.4820E−02 | −4.3100E−04 | 9.1191E−05 | 1.2726E−04 | −9.6160E−05 | 1.9715E−05 | −1.3048E−06 |

TABLE 15

| | parameter | | | | | | |
|---|---|---|---|---|---|---|---|
| | ImgH (mm) | f (mm) | f1 (mm) | f2 (mm) | f3 (mm) | f4 (mm) | TTL (mm) |
| numerical value | 2.44 | 1.07 | −3.04 | −11.58 | 3.44 | 4.31 | 11.30 |

Figure 10C:
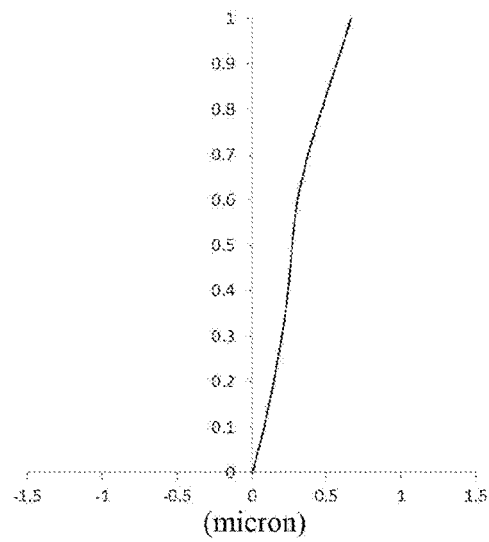
Figure 10D:
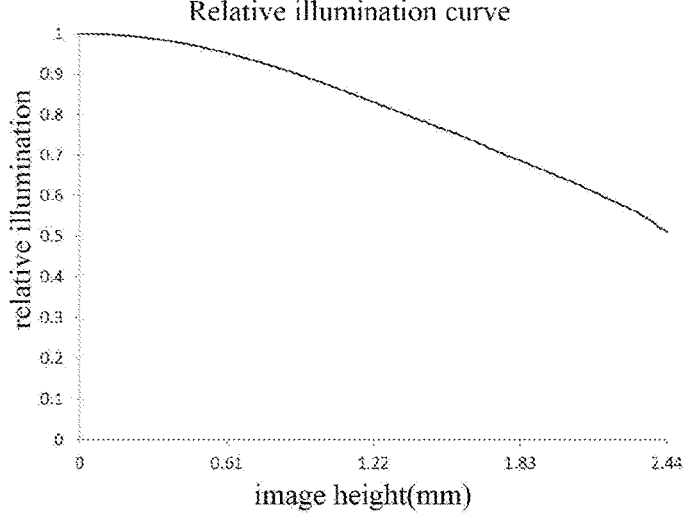

FIG. 10A shows the longitudinal aberration curve of the camera lens assembly according to Embodiment 5, representing deviations of converged focal points of light of different wavelengths after passing through the camera lens assembly. FIG. 10B shows the astigmatic curve of the camera lens assembly according to Embodiment 5, representing a curvature of the tangential image plane and a curvature of the sagittal image plane. FIG. 10C shows the lateral color curve of the camera lens assembly according to Embodiment 5, representing deviations of different image heights on the image plane after light passes through the camera lens assembly. FIG. 10D shows the relative illumination curve of the camera lens assembly according to Embodiment 5, representing the brightness of the image on the optical axis of the lens assembly, that is, the center of the screen. It can be seen from FIG. 10A to FIG. 10D that the camera lens assembly given in Embodiment 5 can achieve a good imaging quality.

Embodiment 6

A camera lens assembly according to Embodiment 6 of the present disclosure is described below with reference to FIGS. 11-12D.

Figure 11:
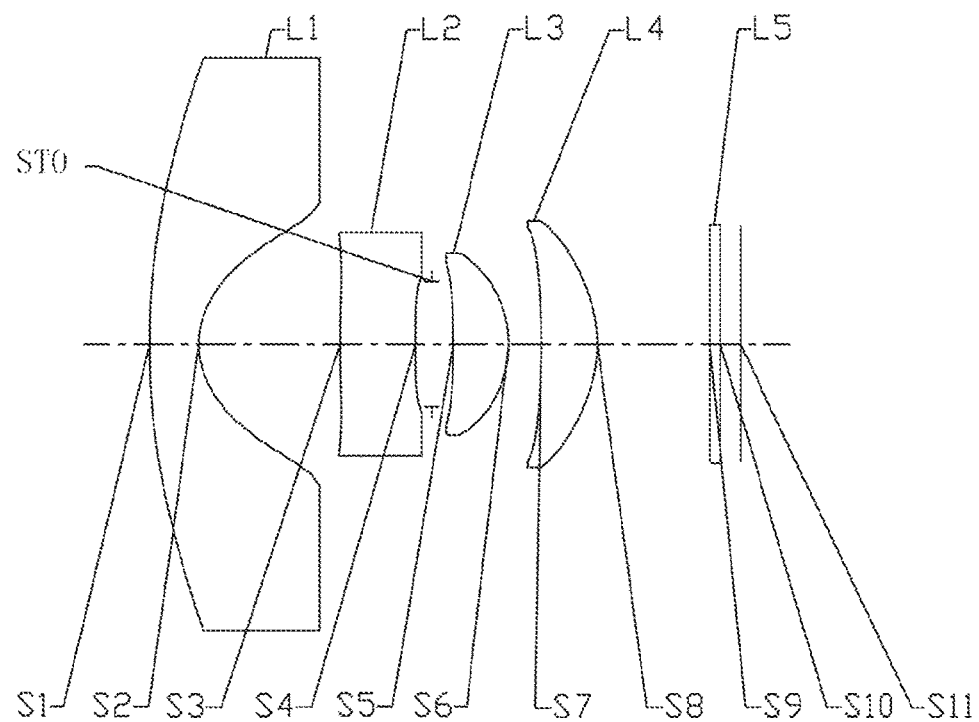
FIG. 11 is a schematic structural diagram illustrating a camera lens assembly according to Embodiment 6 of the present disclosure.

FIG. 11 is a schematic structural diagram illustrating the camera lens assembly according to Embodiment 6 of the present disclosure. As shown in FIG. 11, the camera lens assembly according to Embodiment 6 includes the first to fourth lenses L1-L4 respectively having an object-side surface and an image-side surface.

In the present embodiment, the first lens L1 may have a negative refractive power, and an image-side surface of the first lens is a concave surface. The second lens L2 may have a positive refractive power. The third lens L3 may have a positive refractive power. The fourth lens L4 may have a positive refractive power, and an image-side surface of the fourth lens is a convex surface.

Table 16 shows the surface type, the radius of curvature, the thickness, the material and the conic coefficient of each lens of the camera lens assembly in Embodiment 6. Table 17 shows the high-order coefficients applicable to each aspheric surface in Embodiment 6. Table 18 shows the effective focal lengths f1-f4 of the lenses, the effective focal length f of the camera lens assembly, the half of the diagonal length ImgH of the effective pixel area on the electronic photosensitive element of the camera lens assembly and the distance TTL from the object-side surface S1 of the first lens L1 to the image plane S11 of the camera lens assembly on the optical axis in Embodiment 6. The surface type of each aspheric surface may be defined by the formula (1) given in Embodiment 1.

TABLE 16

| surface number | surface type | radius of curvature | thickness | refractive index | abbe number | conic coefficient |
|---|---|---|---|---|---|---|
| OBJ | spherical | infinite | infinite | | | |
| S1 | aspheric | 16.5713 | 1.0000 | 1.53 | 55.8 | −5.3828 |
| S2 | aspheric | 1.5227 | 2.8418 | | | −1.8452 |
| S3 | aspheric | 22.4444 | 1.5194 | 1.62 | 23.5 | 0.0000 |
| S4 | aspheric | 47.4193 | 0.3230 | | | 0.0000 |
| STO | spherical | infinite | 0.4343 | | | |
| S5 | aspheric | −24.6314 | 1.1260 | 1.53 | 55.8 | 0.0000 |
| S6 | aspheric | −1.9835 | 0.6583 | | | −0.2785 |
| S7 | aspheric | −15.0008 | 1.1248 | 1.62 | 23.5 | 0.0000 |
| S8 | aspheric | −2.5921 | 2.2613 | | | 0.0000 |
| S9 | spherical | infinite | 0.2100 | 1.52 | 64.2 | |
| S10 | spherical | infinite | 0.4136 | | | |
| S11 | spherical | infinite | | | | |

TABLE 17

| surface number | A4 | A6 | A8 | A10 | A12 | A14 | A16 |
|---|---|---|---|---|---|---|---|
| S1 | 2.8326E−03 | −3.8322E−04 | 3.0792E−05 | −1.5285E−06 | 4.5787E−08 | −7.5440E−10 | 5.2004E−12 |
| S2 | 3.0314E−02 | 9.3579E−03 | −6.1721E−03 | 1.6901E−03 | −2.1926E−04 | 8.9511E−06 | 1.6549E−07 |
| S3 | −1.1786E−02 | 8.4173E−03 | −6.8939E−03 | 3.3622E−03 | −9.1495E−04 | 1.2473E−04 | −6.5343E−06 |
| S4 | 1.0962E−02 | 2.7741E−02 | −2.6194E−02 | −2.7232E−03 | 3.8351E−02 | −3.0724E−02 | 7.8680E−03 |
| S5 | −1.7652E−02 | 6.3507E−03 | −1.0055E−02 | 9.3664E−03 | −5.2212E−03 | 1.4764E−03 | −1.5336E−04 |
| S6 | 1.7395E−02 | −3.1350E−02 | 3.6916E−02 | −2.8163E−02 | 1.2375E−02 | −2.9380E−03 | 2.8134E−04 |
| S7 | 1.0345E−04 | −4.2773E−04 | 9.7356E−05 | −4.0435E−05 | 6.2739E−22 | 1.3153E−24 | 2.7568E−27 |
| S8 | 7.9194E−03 | 1.5622E−03 | −5.8276E−04 | 1.8911E−04 | −2.9855E−05 | 1.6626E−06 | 1.6721E−08 |

TABLE 18

| | parameter | | | | | | |
|---|---|---|---|---|---|---|---|
| | ImgH (mm) | f (mm) | f1 (mm) | f2 (mm) | f3 (mm) | f4 (mm) | TTL (mm) |
| numerical value | 2.32 | 1.30 | −3.23 | 67.14 | 3.99 | 4.88 | 11.91 |

Figure 12A:
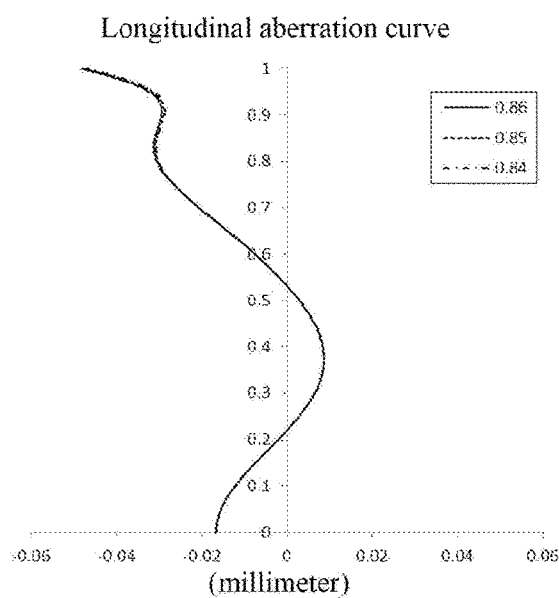
FIGS. 12A-12D respectively illustrate a longitudinal aberration curve, an astigmatic curve, a lateral color curve, and a relative illumination curve of the camera lens assembly according to Embodiment 6.
Figure 12B:
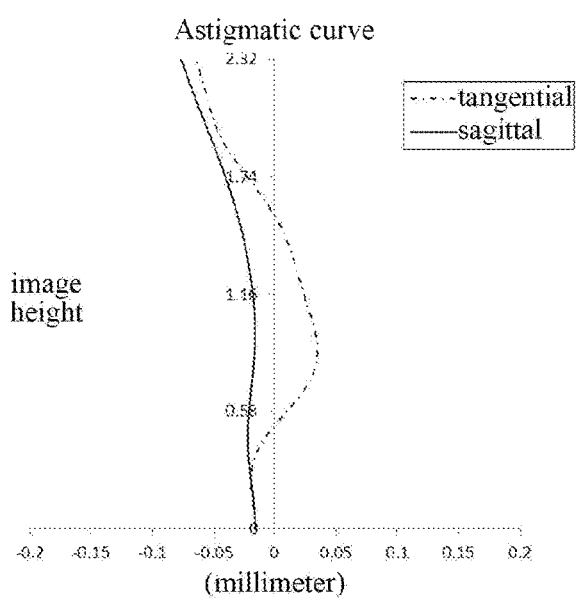
Figure 12C:
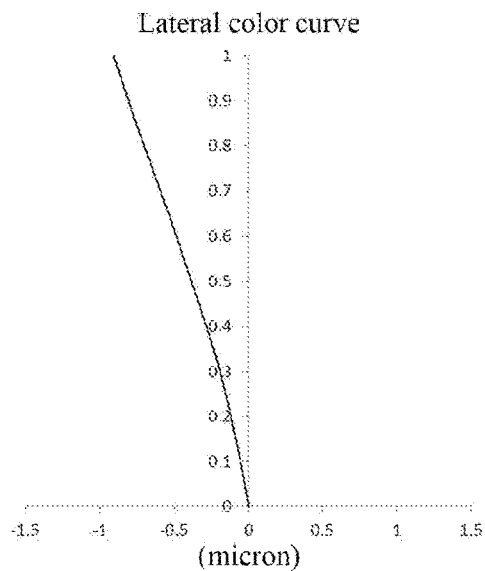
Figure 12D:
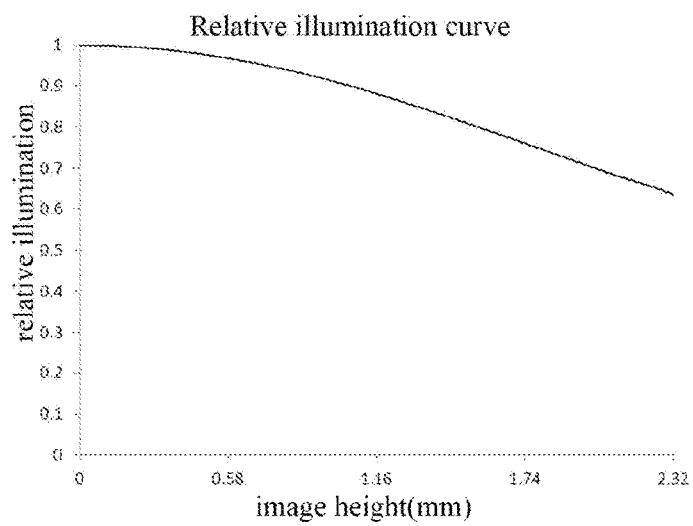

FIG. 12A shows the longitudinal aberration curve of the camera lens assembly according to Embodiment 6, representing deviations of converged focal points of light of different wavelengths after passing through the camera lens assembly. FIG. 12B shows the astigmatic curve of the camera lens assembly according to Embodiment 6, representing a curvature of the tangential image plane and a curvature of the sagittal image plane. FIG. 12C shows the lateral color curve of the camera lens assembly according to Embodiment 6, representing deviations of different image heights on the image plane after light passes through the camera lens assembly. FIG. 12D shows the relative illumination curve of the camera lens assembly according to Embodiment 6, representing the brightness of the image on the optical axis of the lens assembly, that is, the center of the screen. It can be seen from FIG. 12A to FIG. 12D that the camera lens assembly given in Embodiment 6 can achieve a good imaging quality.

Embodiment 7

A camera lens assembly according to Embodiment 7 of the present disclosure is described below with reference to FIGS. 13-14D.

Figure 13:
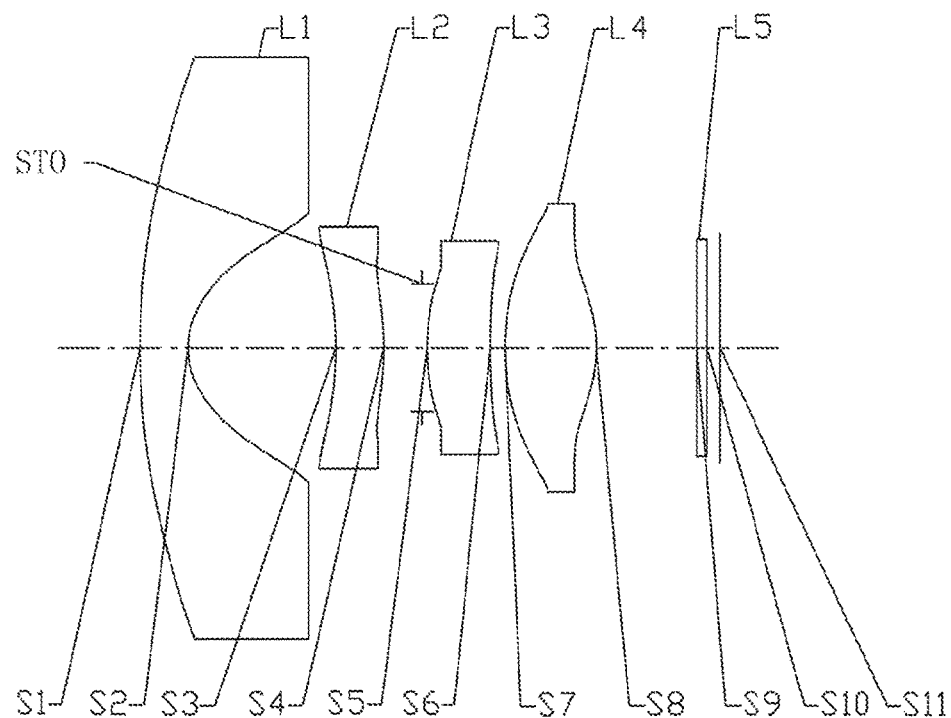
FIG. 13 is a schematic structural diagram illustrating a camera lens assembly according to Embodiment 7 of the present disclosure.

FIG. 13 is a schematic structural diagram illustrating the camera lens assembly according to Embodiment 7 of the present disclosure. As shown in FIG. 13, the camera lens assembly according to Embodiment 7 includes the first to fourth lenses L1-L4 respectively having an object-side surface and an image-side surface.

In the present embodiment, the first lens L1 may have a negative refractive power, and an image-side surface of the first lens is a concave surface. The second lens L2 may have a positive refractive power. The third lens L3 may have a positive refractive power. The fourth lens L4 may have a positive refractive power, and an image-side surface of the fourth lens is a convex surface.

Table 19 shows the surface type, the radius of curvature, the thickness, the material and the conic coefficient of each lens of the camera lens assembly in Embodiment 7. Table 20 shows the high-order coefficients applicable to each aspheric surface in Embodiment 7. Table 21 shows the effective focal lengths f1-f4 of the lenses, the effective focal length f of the camera lens assembly, the half of the diagonal length ImgH of the effective pixel area on the electronic photosensitive element of the camera lens assembly and the distance TTL from the object-side surface S1 of the first lens L1 to the image plane S11 of the camera lens assembly on the optical axis in Embodiment 7. The surface type of each aspheric surface may be defined by the formula (1) given in Embodiment 1.

TABLE 19

| surface number | surface type | radius of curvature | thickness | material refractive index | abbe number | conic coefficient |
|---|---|---|---|---|---|---|
| OBJ | spherical | infinite | infinite | | | |
| S1 | aspheric | 16.7936 | 1.0000 | 1.53 | 55.8 | −6.1036 |
| S2 | aspheric | 1.4072 | 3.0521 | | | −1.8127 |
| S3 | aspheric | −7.6647 | 0.9902 | 1.62 | 23.5 | 0.0000 |
| S4 | aspheric | −5.5254 | 0.7957 | | | 0.0000 |
| STO | spherical | infinite | 0.1019 | | | |
| S5 | aspheric | 4.7145 | 1.3161 | 1.53 | 55.8 | 1.1226 |
| S6 | aspheric | 18.1213 | 0.3042 | | | −456.8774 |
| S7 | aspheric | 4.3014 | 1.8862 | 1.62 | 23.5 | −2.7499 |
| S8 | aspheric | −2.5355 | 2.0745 | | | 0.0000 |
| S9 | spherical | infinite | 0.2100 | 1.52 | 64.2 | |
| S10 | spherical | infinite | 0.2692 | | | |
| S11 | spherical | infinite | | | | |

TABLE 20

| surface number | A4 | A6 | A8 | A10 | A12 | A14 | A16 |
|---|---|---|---|---|---|---|---|
| S1 | 1.6078E−03 | −9.4060E−05 | 1.6946E−07 | 2.2964E−07 | −1.1524E−08 | 2.4903E−10 | −2.1076E−12 |
| S2 | 2.8880E−02 | 3.5396E−04 | 2.3023E−03 | −1.4583E−03 | 3.5786E−04 | −4.3033E−05 | 2.0259E−06 |
| S3 | −1.1629E−02 | 1.7868E−03 | 1.4356E−03 | −7.1308E−04 | 1.5202E−04 | −1.5733E−05 | 6.3215E−07 |
| S4 | 6.5089E−03 | −7.9948E−03 | 2.2589E−02 | −2.0025E−02 | 9.0602E−03 | −2.0435E−03 | 1.8278E−04 |
| S5 | −4.6352E−03 | 4.2142E−02 | −6.8807E−02 | 6.0973E−02 | −3.1156E−02 | 8.8413E−03 | −1.1013E−03 |
| S6 | 1.7626E−02 | −1.5255E−02 | 1.6510E−02 | −1.0828E−02 | 3.8139E−03 | −6.6279E−04 | 4.4242E−05 |
| S7 | −9.8144E−03 | 1.2765E−02 | −6.9785E−03 | 2.5035E−03 | −5.1719E−04 | 5.3968E−05 | −2.2004E−06 |
| S8 | 2.1108E−02 | 6.0356E−03 | −4.7701E−03 | 2.9616E−03 | −9.6797E−04 | 1.6782E−04 | −1.2035E−05 |

TABLE 21

| parameter | | | | | | |
|---|---|---|---|---|---|---|
| ImgH (mm) | f (mm) | f1 (mm) | f2 (mm) | f3 (mm) | f4 (mm) | TTL (mm) |
| numerical value | | | | | | |
| 2.32 | 1.18 | −2.96 | 27.11 | 11.60 | 2.88 | 12.00 |

Figure 14A:
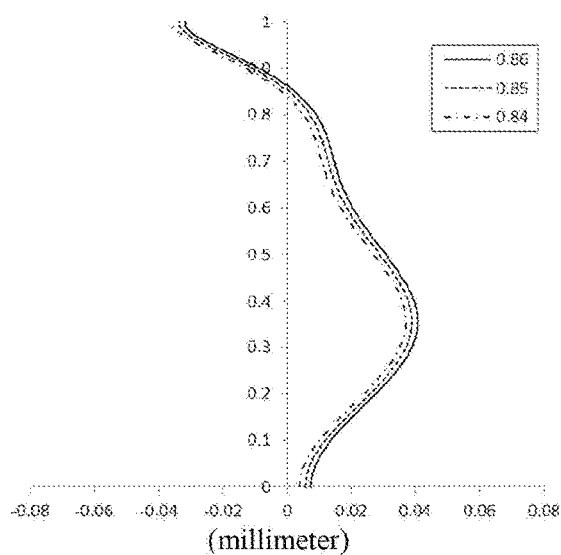
FIGS. 14A-14D respectively illustrate a longitudinal aberration curve, an astigmatic curve, a lateral color curve, and a relative illumination curve of the camera lens assembly according to Embodiment 7.
Figure 14B:
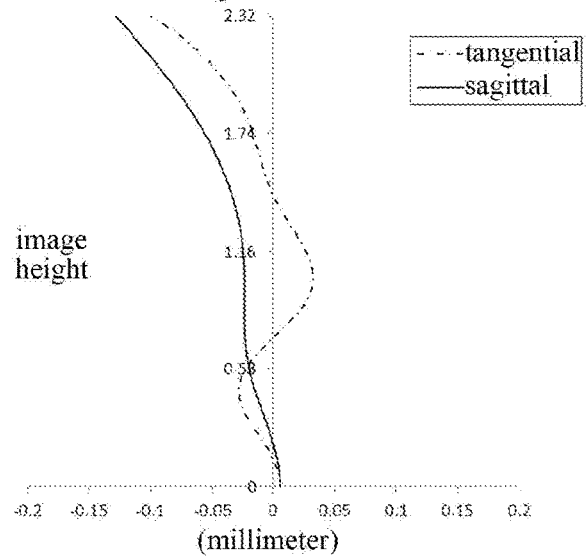
Figure 14C:
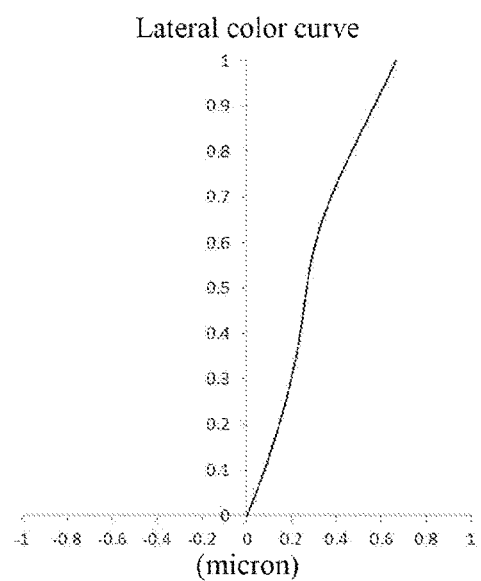
Figure 14D:
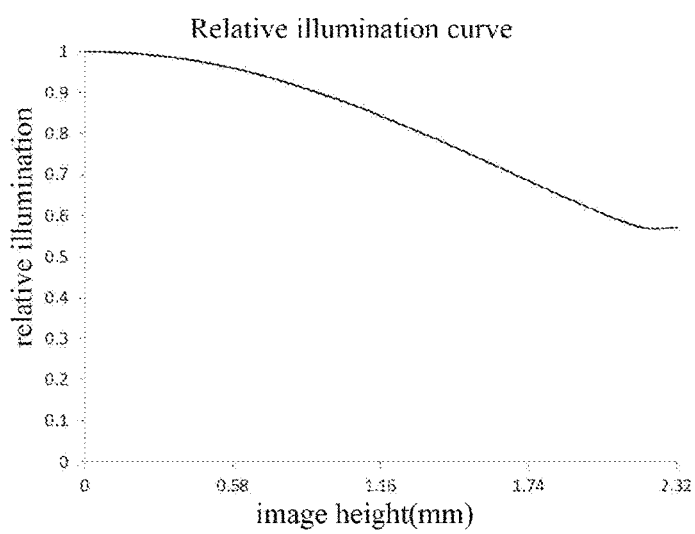

FIG. 14A shows the longitudinal aberration curve of the camera lens assembly according to Embodiment 7, representing deviations of converged focal points of light of different wavelengths after passing through the camera lens assembly. FIG. 14B shows the astigmatic curve of the camera lens assembly according to Embodiment 7, representing a curvature of the tangential image plane and a curvature of the sagittal image plane. FIG. 14C shows the lateral color curve of the camera lens assembly according to Embodiment 7, representing deviations of different image heights on the image plane after light passes through the camera lens assembly. FIG. 14D shows the relative illumination curve of the camera lens assembly according to Embodiment 7, representing the brightness of the image on the optical axis of the lens assembly, that is, the center of the screen. It can be seen from FIG. 14A to FIG. 14D that the camera lens assembly given in Embodiment 7 can achieve a good imaging quality.

To sum up, Embodiment 1 to Embodiment 7 respectively satisfy the relationships shown in Table 22 below.

TABLE 22

| Conditional Expression | Embodiment | | | | | | |
|---|---|---|---|---|---|---|---|
| | 1 | 2 | 3 | 4 | 5 | 6 | 7 |
| f/EPD | 1.19 | 1.19 | 0.99 | 1.19 | 1.19 | 1.19 | 1.19 |
| f1/f | −2.32 | −2.40 | −2.75 | −2.62 | −2.84 | −2.49 | −2.51 |
| ImgH/f | 1.96 | 1.84 | 2.22 | 1.19 | 2.28 | 1.79 | 1.97 |
| R2/f | 1.06 | 1.13 | 1.21 | 1.11 | 1.38 | 1.17 | 1.20 |
| CT1/(CT2 + CT3 + CT4) | 0.37 | 0.25 | 0.23 | 0.31 | 0.24 | 0.27 | 0.24 |
| T12/T23 | 2.38 | 2.92 | 2.06 | 2.50 | 2.33 | 3.75 | 3.40 |
| DT11/ImgH | 1.81 | 2.15 | 2.23 | 1.24 | 2.56 | 2.35 | 2.42 |
| DT32/f3 | 0.38 | 0.50 | 0.49 | 0.45 | 0.55 | 0.43 | 0.18 |
| ΣCT/TTL | 0.37 | 0.42 | 0.45 | 0.35 | 0.46 | 0.40 | 0.43 |
| SAG11/CT1 | 1.42 | 1.22 | 1.71 | 0.93 | 1.68 | 1.10 | 1.14 |

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar function.

What is claimed is:

1. A camera lens assembly, comprising in sequence from an object side to an image side along an optical axis,
    a first lens having a negative refractive power, and a concave image-side surface;
    a second lens having a positive refractive power or a negative refractive power;
    a third lens having a positive refractive power;
    a fourth lens having a positive refractive power or a negative refractive power, and a convex image-side surface; and
    an electronic photosensitive element;
    wherein an effective radius of an object-side surface of the first lens is DT11, a half of a diagonal length of an effective pixel area on the electronic photosensitive element is ImgH, and the following relation is satisfied: 1.2<DT11/ImgH<2.6, and
    wherein the camera lens assembly has and only has four lenses having refractive power,
    wherein 0.2<CT1/(CT2+CT3+CT4)<0.5,
        where CT1 is a center thickness of the first lens on the optical axis,
        CT2 is a center thickness of the second lens on the optical axis, CT3 is a center thickness of the third lens on the optical axis, and CT4 is a center thickness of the fourth lens on the optical axis.

2. The camera lens assembly according to claim 1, wherein an effective focal length f of the camera lens assembly and an entrance pupil diameter EPD of the camera lens assembly satisfy: f/EPD≤1.8.

3. The camera lens assembly according to claim 1, wherein an effective focal length f1 of the first lens and the effective focal length f of the camera lens assembly satisfy: −4<f1/f<−2.

4. The camera lens assembly according to claim 1, wherein the half of the diagonal length ImgH of the effective pixel area on the electronic photosensitive element of the camera lens assembly and the effective focal length f of the camera lens assembly satisfy: Imgh/f>1.

5. The camera lens assembly according to claim 4, wherein a radius of curvature R2 of the image-side surface of the first lens and the effective focal length f of the camera lens assembly satisfy: 1<R2/f<1.5.

6. The camera lens assembly according to claim 1, satisfying 2<T12/T23<4, wherein T12 is an air spacing distance between the first lens and the second lens on the optical axis, and T23 is an air spacing distance between the second lens and the third lens on the optical axis.

7. The camera lens assembly according to claim 4, wherein an effective radius DT32 of an image-side surface of the third lens and an effective focal length f3 of the third lens satisfy: 0.1<DT32/f3<0.6.

8. The camera lens assembly according to claim 4, satisfying 0.3<ΣCT/TTL<0.6, wherein ΣCT is a sum of center thicknesses of the first lens to the fourth lens on the optical axis, and TTL is a distance from the object-side surface of the first lens to an image plane on the optical axis.

9. The camera lens assembly according to claim 4, satisfying 0.9<SAG11/CT1<1.75, wherein SAG11 is a distance from an intersection point of the object-side surface of the first lens and the optical axis to an effective radius vertex of the object-side surface of the first lens on the optical axis, and CT1 is the center thickness of the first lens on the optical axis.

10. The camera lens assembly according to claim 4, wherein an infrared bandpass filter is disposed between the fourth lens and an image plane of the camera lens assembly.

11. A camera lens assembly, comprising in sequence from an object side to an image side along an optical axis, a first lens having a negative refractive power, and a concave image-side surface;

a second lens;

a third lens having a positive refractive power; and a fourth lens having a convex image-side surface;

wherein a combined refractive power of the first lens and the second lens is negative;

a combined refractive power of the third lens and the fourth lens is positive; and wherein a distance from an intersection point of an object-side surface of the first lens and the optical axis to an effective radius vertex of the object-side surface of the first lens on the optical axis is SAG11, a center thickness of the first lens on the optical axis is CT1, and the following relation is satisfied: 0.9<SAG11/CT1<1.75, and wherein the camera lens assembly has and only has four lenses having refractive power, wherein 0.2<CT1/(CT2+CT3+CT4)<0.5, where CT1 is a center thickness of the first lens on the optical axis, CT2 is a center thickness of the second lens on the optical axis, CT3 is a center thickness of the third lens on the optical axis, and CT4 is a center thickness of the fourth lens on the optical axis.

12. The camera lens assembly according to claim 11, wherein the second lens has a negative refractive power.

13. The camera lens assembly according to claim 11, wherein the fourth lens has a positive refractive power or a negative refractive power.

* * * * *